United States Patent
Schneider

(10) Patent No.: US 11,282,245 B2
(45) Date of Patent: *Mar. 22, 2022

(54) PRICE CHART DISPLAY SYSTEM, METHOD, AND DEVICE

(71) Applicant: Eric Schneider, Delray Beach, FL (US)

(72) Inventor: Eric Schneider, Delray Beach, FL (US)

(*) Notice: Subject to any disclaimer, the term of this patent is extended or adjusted under 35 U.S.C. 154(b) by 96 days.

This patent is subject to a terminal disclaimer.

(21) Appl. No.: 16/932,345

(22) Filed: Jul. 17, 2020

(65) Prior Publication Data

US 2021/0256743 A1    Aug. 19, 2021

Related U.S. Application Data

(63) Continuation-in-part of application No. 16/790,512, filed on Feb. 13, 2020, now Pat. No. 10,755,458.

(51) Int. Cl.
*G06T 11/20*     (2006.01)
*G06Q 40/06*     (2012.01)
*G06F 3/14*      (2006.01)

(52) U.S. Cl.
CPC .............. *G06T 11/206* (2013.01); *G06F 3/14* (2013.01); *G06Q 40/06* (2013.01); *G06T 11/203* (2013.01)

(58) Field of Classification Search
CPC ........ G06T 11/206; G06T 11/203; G06F 3/14; G06Q 40/06
See application file for complete search history.

(56) References Cited

U.S. PATENT DOCUMENTS

| | | | |
|---|---|---|---|
| 7,043,449 B1 | 5/2006 | Li et al. | |
| 7,212,208 B2 | 5/2007 | Khozai | |
| 7,356,501 B2 | 4/2008 | Churquina | |
| 7,542,940 B2 | 6/2009 | Burns et al. | |
| 7,707,100 B2 | 4/2010 | Hjartberg et al. | |
| 7,844,487 B2 | 11/2010 | Chapman | |
| 7,882,002 B2 | 2/2011 | Monroe et al. | |
| 8,650,115 B1 | 2/2014 | Seiden et al. | |
| 8,661,358 B2 | 2/2014 | Duncker et al. | |
| 10,037,574 B2 | 7/2018 | Decker et al. | |
| 2004/0164983 A1 | 8/2004 | Khozai | |
| 2004/0267654 A1 | 12/2004 | Peng et al. | |
| 2007/0067233 A1 | 3/2007 | Dalal | |
| 2009/0192877 A1 | 7/2009 | Chapman | |
| 2011/0137822 A1 | 6/2011 | Chapman | |
| 2013/0066803 A1 | 3/2013 | Worlikar | |
| 2013/0080312 A1 | 3/2013 | Kawamura | |

(Continued)

OTHER PUBLICATIONS

International Search Report dated Sep. 30, 2020 in International Application No. PCT/US2020/042622.

(Continued)

*Primary Examiner* — Ryan R Yang

(57) ABSTRACT

A method of displaying a price range of a market traded security during a time period includes a charting engine displaying a price bar, having a width of the time period, generating at least one of an upper and lower price bar, the upper bar having a height of a high price at a first time and the lower bar having a height of a low price at a second time during the time period, connecting a bottom of the upper price bar to the top of the price bar and the top of the lower bar to the bottom of the price bar, and displaying the price bar, the upper bar, and the lower bar that visually depicts and enables the user to see proportional to the price bar when the upper price bar and the lower price bar have occurred during the time period.

40 Claims, 18 Drawing Sheets

(56) References Cited

U.S. PATENT DOCUMENTS

| | | |
|---|---|---|
| 2013/0080370 A1 | 3/2013 | Zadeh |
| 2013/0187926 A1 | 7/2013 | Silverstein et al. |
| 2013/0191267 A1 | 7/2013 | Rooney |
| 2014/0143115 A1 | 5/2014 | Kono |
| 2015/0066725 A1 | 3/2015 | Cai |
| 2015/0154700 A1 | 6/2015 | Hackett |
| 2015/0242997 A1 | 8/2015 | Sun et al. |
| 2015/0244850 A1 | 8/2015 | Rodriguez et al. |
| 2016/0217526 A1 | 7/2016 | Decker |
| 2016/0300303 A1 | 10/2016 | Seiden et al. |
| 2017/0018032 A1 | 1/2017 | Chen et al. |
| 2017/0301024 A1 | 10/2017 | Dalal et al. |
| 2018/0189990 A1 | 7/2018 | Cardno et al. |
| 2018/0315123 A1 | 11/2018 | Cohen |

OTHER PUBLICATIONS

International Search Report dated Oct. 19, 2021 in International Application No. PCT/US2021/040780.

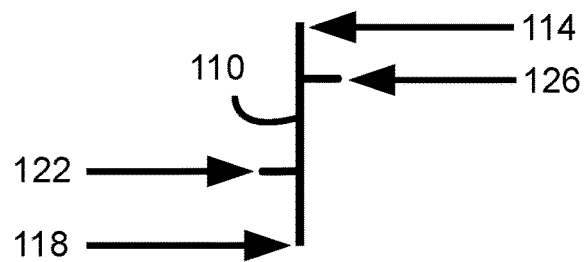
Prior Art
Fig. 1-A
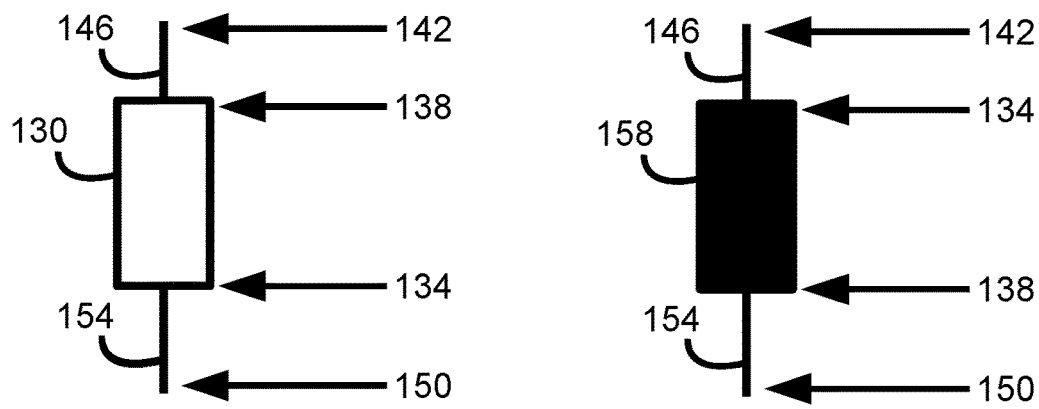
Prior Art
Fig. 1-B
Prior Art
Fig. 1-C
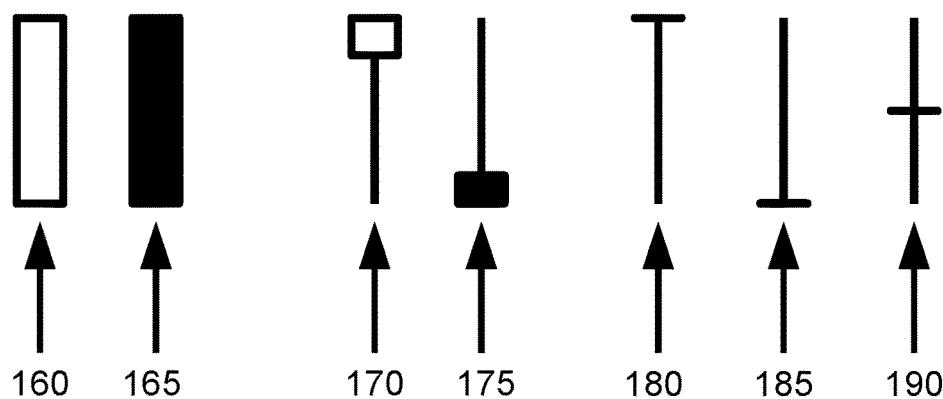
Prior Art
Fig. 1-D

Time/Sales Data (345)

| Date/Time | Symbol | Price | Size | Exchange |
|---|---|---|---|---|
| 20200210:0930.12 | XYZ | 99.50 | 120 | NASDAQ |
| 20200210:0930.48 | XYZ | 101.50 | 500 | NASDAQ |
| 20200210:0931.18 | XYZ | 98 | 310 | NASDAQ |
| 20200210:0931.36 | XYZ | 102 | 880 | NASDAQ |
| 20200210:0932.15 | XYZ | 104 | 630 | NASDAQ |
| 20200210:0932.45 | XYZ | 101 | 470 | NASDAQ |

Fig. 4-A

OHLC Data (350)

| Date/Time | 20200210:0930.00 | 20200210:0931.00 | 20200210:0932.00 |
|---|---|---|---|
| Symbol | XYZ | XYZ | XYZ |
| Open | 100 | 101 | 100 |
| High | 101.50 | 102 | 104 |
| Low | 99.50 | 98 | 101 |
| Close | 101 | 99 | 102 |
| Volume | 15000 | 20000 | 25000 |

Fig. 4-B

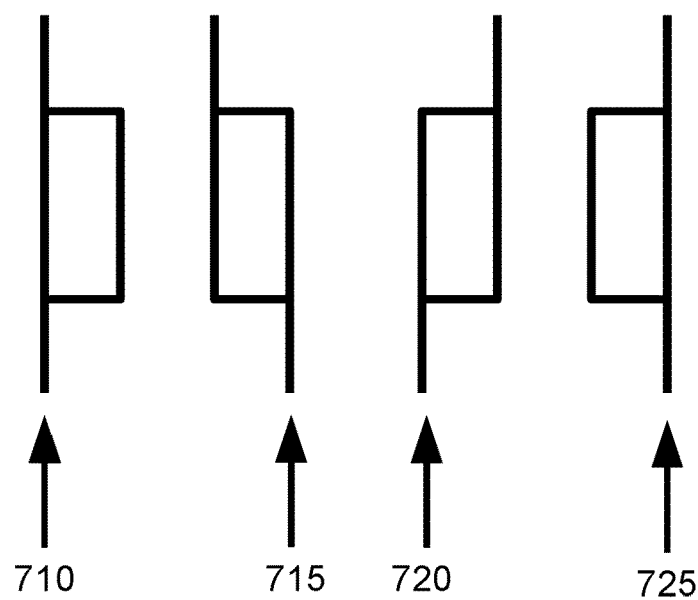
Fig. 7-A
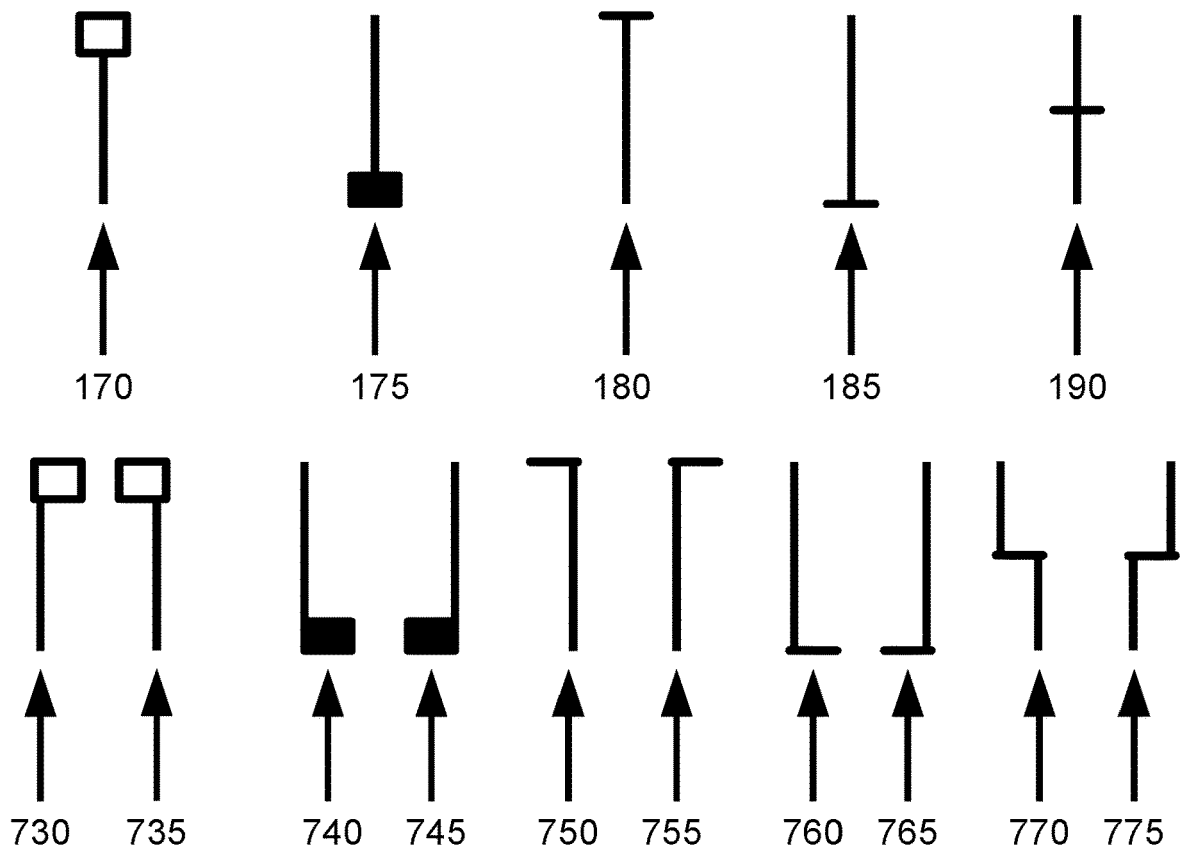
Fig. 7-B

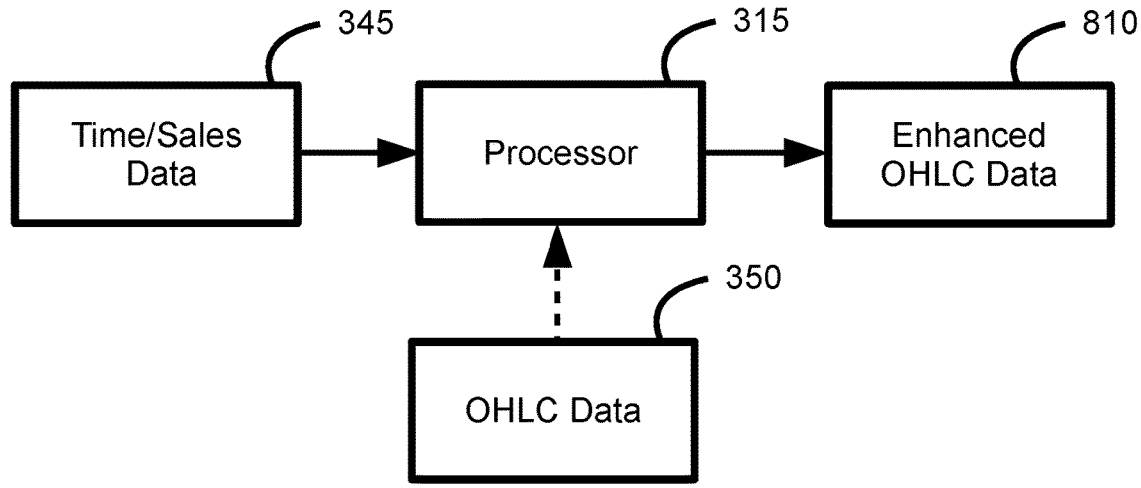
Fig. 8-A
| Date/Time | 20200210:0930.00 | 20200210:0931.00 | 20200210:0932.00 |
|---|---|---|---|
| Symbol | XYZ | XYZ | XYZ |
| Open | 100 | 101 | 100 |
| High | 101.50 | 102 | 104 |
| Low | 99.50 | 98 | 101 |
| Close | 101 | 99 | 102 |
| Volume | 15000 | 20000 | 25000 |
| Time of High | 0930.48 | 0931.36 | 0932.15 |
| Time of Low | 0930.12 | 0931.18 | 0932.45 |
| High Time % | 80 | 60 | 25 |
| Low Time % | 20 | 30 | 75 |
Fig. 8-B

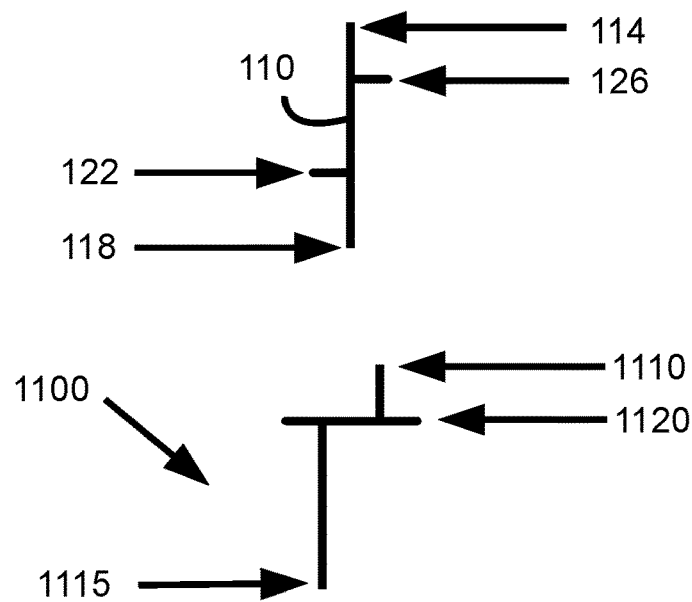
Fig. 11-A
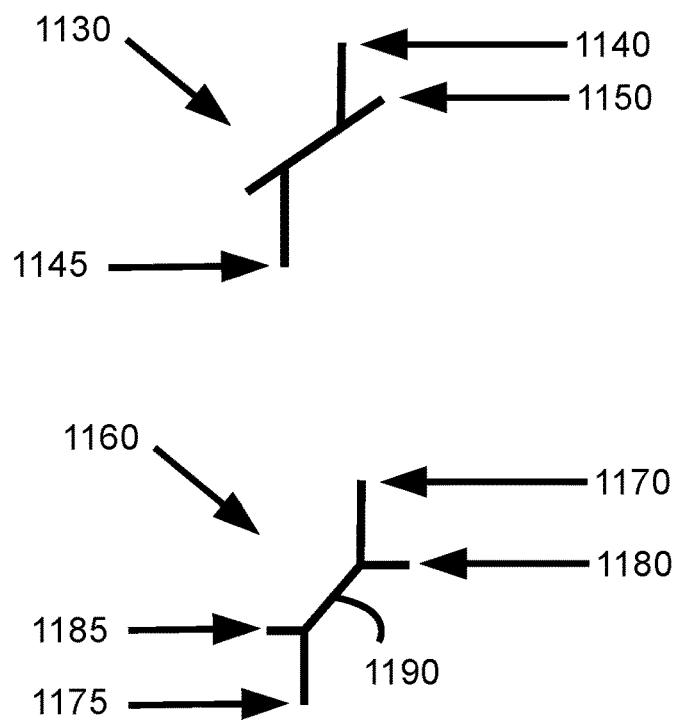
Fig. 11-B

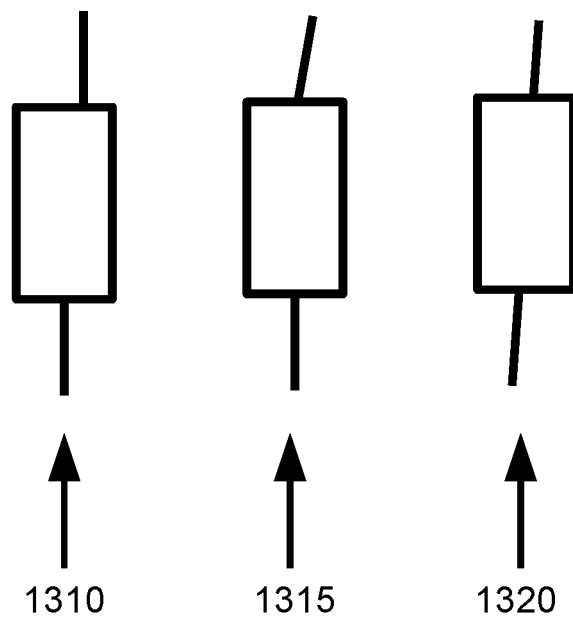
Fig. 13-A
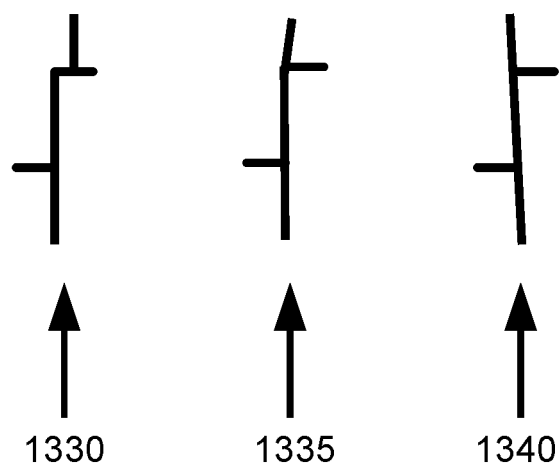
Fig. 13-B

PRICE CHART DISPLAY SYSTEM, METHOD, AND DEVICE

CROSS REFERENCE TO RELATED APPLICATIONS

This application is a continuation in part of U.S. patent application Ser. No. 16/790,512, filed Feb. 13, 2020, which is incorporated by reference herein in its entirety.

FIELD OF THE INVENTION

This invention generally relates to a computer implemented charting method and more specifically relates to a system, method, and device for generating and displaying enhanced price bar type charts representative of a price range of a market traded security during a time period.

BACKGROUND OF THE INVENTION

A bar chart also known as a OHLC (Open, High, Low, Close) chart is a collection of price bars, with each bar showing the price movements for a given time period. As shown in prior art of FIG. 1-A, each bar has a vertical line 110 that shows the highest price 114 and the lowest price 118 reached during the time period. The opening price 122 is marked by a tick mark of a small horizontal line on the left of the vertical line 110, and the closing price 126 is marked by a tick mark of a small horizontal line on the right of the vertical line 110. A bar chart variation might only display a HLC (High, Low, Close) chart including HLC bars that omit the opening price 122 and does not include the tick mark of a small horizontal line on the left of the vertical line 110. Bar charts are very similar to Japanese candlestick charts. The two chart types show the same information but in different ways. Candlesticks also have a vertical line showing the high and low of the period, but the difference between the open and close is represented by a thicker portion called a body. Neither of these charts show more specific information as to when the high price and low price occurred during that given time period nor do these charts even indicate which of a high price and low price came first.

Since the latter part of the nineteenth century far-eastern traders have used candlesticks for charting markets and for analysis based on trends in market psychology. Candlestick patterns are now commonly used in technical analysis to describe price movements of securities (e.g., stocks, bonds, ETFs, mutual funds, etc.), derivatives (e.g., options, forwards, futures, swaps, etc.), indices, or currencies over time. As shown in prior art of FIG. 1-B, the candlestick consists of a rectangular body 130, the height of which represents the difference between a time period's open price 134 and close price 138. A centerline projecting from the top of the rectangle extends upward to the period's high price 142 is known as an upper wick 146 whereas a similar centerline extends from the bottom to the period's low price 150 is known as a lower wick 154. When the closing trade price 138 is higher than its opening trade price 134, the body 130 of the up or bullish candlestick is filled with usually a white or green color. As shown in prior art of FIG. 1-C, as the opening trade price 134 is higher than its closing trade price 138, the body of the down or bearish candlestick is filled 158 with usually a black or red color.

The length of the candlestick varies with the price difference. When the price ranges between the opening trade price and the closing trade price increase, the body will be lengthened. Likewise, the upper or lower wick will be lengthened due to the highest or lowest trade price, respectively. As shown in prior art of FIG. 1-D, candlestick patterns have emerged due to the variety of sizes of both body and wicks. To name a few, a bullish Marubozu 160 and bearish Marubozu 165 have no wicks which occur when the highs and the lows also represent the opening and the closing prices and is considered a continuation pattern. A Hanging Man 170 can be a black or a white candlestick that consists of a small body near the high with a little or no upper wick and a long lower wick. The lower wick should be two or three times the height of the body and is considered a bearish pattern during an uptrend. Similarly, a Shooting Star 175 can be a black or a white candlestick that has a small body, a long upper wick and a little or no lower wick and is considered a bearish pattern in an uptrend.

A Dragonfly Doji 180 is formed when the opening and the closing prices are at the highest of the day. If it has a longer lower wick it signals a more bullish trend. When appearing at market bottoms it is considered to be a reversal signal and a Gravestone Doji 185 is formed when the opening and closing prices are at the lowest of the day. If it has a longer upper wick it signals a bearish trend. When it appears at market top it is considered a reversal signal. Lastly, a Long-Legged Doji 190 consists of a Doji with very long upper and lower wicks indicating strong forces balanced in opposition and possible market indecision. Nearly all candlestick patterns fall into three broad categories, namely bull, bear, and doji categories. There can be a price gap between adjacent candlesticks which occurs when the high and low price range of the first candlestick does not overlap with the high and low price of the second candlestick.

Both price bars and candlestick wicks are displayed along a centerline of a vertical axis to show the high and low price range of a given time period and does not offer more specific information as to when the high price and low price occurred during that given time period. Although an improvement is disclosed in U.S. Pat. No. 7,844,487 issued on Nov. 30, 2010 by Chapman, entitled, "Computer-implemented method for displaying price and value extremes" by adding angled tips to the top and bottom of a price bar to serve as additional visual indicators that show which of the high price and low price came first, such teaching relies on adding additional graphical information and remains silent on displaying more precisely when the high price and low price had occurred in a given time period.

U.S. Patent Application 20040267654 filed on Jun. 26, 2003 by Peng, et al., entitled, "Candlestick and bar charts" similarly discloses the addition of new graphical elements in the form of one or more dotted horizontal lines that yield more information as to price direction near the open and/or close price but is silent as to offering any new information regarding when either the high and low price occurred.

To date, all known charting programs from trading software, banks, brokers, independents, and third parties similarly dynamically update a current candlestick for display in a candlestick chart during price changes throughout a given time period of the candlestick by rendering and displaying the same full fixed width of the candlestick while updating the height of the body and wicks along the centerline according to each price change leaving a user without any sense of when the time period ends and left waiting to only then view the final candlestick upon learning of the close price for that time period. Analogously, the same holds true for OHLC and HLC price bars where the vertical line depicting the high price and low price remains though changing in height remains static in the same vertical position throughout the time period. The speculative reason for this is that it appears all charting engines and modules are configured to receive market data in the form of OHLC data which does not specify when the high price or low price has occurred during the time period.

Accordingly, in light of the above, there is a strong need in the art for systems, methods, and devices to overcome this lack of more specific information and provide a user with more timely and more visually accurate charting information during a given time period.

SUMMARY OF THE INVENTION

The present invention enables more specific information to help a user understand more clearly when a high price and low price occurred during a time period without adding any additional visual indicators. The present invention provides a widening body of a candlestick proportional to the percentage of traversal of the time period. The present invention enables for the replacement of conventional candlesticks with enhanced candlesticks. The present invention enables enhanced OHLC data to assist a user with research, analysis, and backtesting with historical data to visualize enhanced candlestick chart data over longer time periods of years or even decades. The present invention provides enhanced OHLC and HLC bar charts that include a separate upper price bar and lower price bar instead of a conventional centerline high-low price bar and further include an open-close bar and close bar respectively that can widen proportional to the percentage of traversal of the time period. The present invention provides a tilting of a centerline high-low price bar of a candlestick or OHLC bar to determine whether the high price or low price occurred first in the time period as well of the tilting or shifting of either upper and lower wicks or upper and lower price bars as alternate ways to visually depict such distinction without relying upon the overlaying of any graphical elements or other visual indicators.

In general, in accordance with the present invention a computer implemented method for displaying to a user a price range of a market traded security during a time period includes a charting engine displaying a price bar, the price bar having a width representative of the time period; generating at least one of an upper price bar and lower price bar, the upper price bar having a height representative of a high price at a first time during the time period and the lower price bar having a height representative of a low price at a second time during the time period, connecting a bottom of the upper price bar to a top of the price bar, the connection dividing the top of the price bar into a first top part and a second top part wherein the ratio between the first top part and the top of the price bar corresponds to the ratio between the first time and the time period and connecting a top of the lower price bar to a bottom of the price bar, the connection dividing the bottom of the price bar into a first bottom part and a second bottom part wherein the ratio between the first bottom part and the bottom of the price bar corresponds to the ratio between the second time and the time period, and the charting engine displaying the price bar, the upper price bar, and the lower price bar that visually depicts and enables the user to see proportional to the price bar when the upper price bar and the lower price bar have occurred during the time period.

In accordance with an aspect of the present invention, a computer implemented method for displaying to a user a HLC (high, low, close) bar representative of a price range of a market traded security during a time period including a plurality of intratime periods includes a charting engine displaying a first vertical line having a height representative of a range between a first high price and first low price from a HLC data of a first intratime period having a first close price, the charting engine displaying a second vertical line adjacent to the first vertical line, the second vertical line having a height representative of a range between a second high price and second low price from a HLC data of a second intratime period having a second close price, determining a highest intratime period having a highest price from each high price of each the intratime period and a lowest intratime period having a lowest price from each low price of each the intratime period, generating the HLC bar including a horizontal close bar and at least one of an upper bar and lower bar by removing all portions of all vertical lines above and below the second close price from all intratime periods other than above the second close price of the highest intratime period and below the second close price of the lowest intratime period, and the charting engine displaying the HLC bar, wherein the HLC bar visually depicts and enables the user to see proportional to the horizontal close bar when the upper bar and the lower bar have occurred during the time period.

In accordance with another aspect of the present invention, a computer implemented method for displaying to a user a OHLC (open, high, low, close) bar representative of a price range of a market traded security during a time period including a plurality of intratime periods includes a charting engine displaying a first vertical line having a height representative of a range between a first high price and first low price from a OHLC (open, high, low, close) data of a first intratime period, the charting engine displaying a second vertical line adjacent to the first vertical line, the second vertical line having a height representative of a range between a second high price and second low price from a OHLC data of a second intratime period having a close price, determining a highest intratime period having a highest price from each high price of each the intratime period and a lowest intratime period having a lowest price from each low price of each the intratime period, generating an open-close line from an open price of the time period and the close price of the second intratime period, and the charting engine generating and displaying the OHLC bar by displaying the open-close line overlayed upon the first vertical line and the second vertical line and generating at least one of an upper bar and lower bar by removing all portions of all vertical lines above and below the open-close line from all intratime periods other than above the open-close line of the highest intratime period and below the open-close line of the lowest intratime period, wherein the OHLC bar visually depicts and enables the user to see proportional to the open-close line when the upper bar and the lower bar have occurred during the time period.

In accordance with an aspect of the present invention, a computer implemented method for displaying a candlestick representative of a price range of a market traded security during a time period having a plurality of intratime periods includes a charting engine displaying a first vertical line having a height representative of a range between a first high price and first low price from a OHLC data of a first intratime period, the charting engine displaying a second vertical line adjacent to the first vertical line, the second vertical line having a height representative of a range between a second high price and second low price from a OHLC data of a second intratime period, generating a body from an open price of the time period and a close price of the second intratime period, determining a highest intratime period having a highest price from each high price of each intratime period and a lowest intratime period having a lowest price from each low price of each intratime period, and the charting engine generating and displaying the candlestick by displaying the body overlayed upon the first vertical line and the second vertical line and generating at least one of an upper wick and lower wick by removing all portions of all vertical lines outside of the body from all intratime periods other than above the body from the highest intratime period and below the body of the lowest intratime period.

In accordance with another aspect of the present invention, a computer implemented method for displaying a candlestick representative of a price range of a market traded security during a time period includes calculating a size of a body of the candlestick, the body having a width and height where the width is representative of the time period and the height is representative of a range between an open price and a close price during the time period, calculating a size of at least one of an upper wick and lower wick of the candlestick, the upper wick having a height representative of a high price at a first time during the time period and the lower wick having a height representative of a low price at a second time during the time period, a charting engine generating the candlestick by connecting a bottom of the upper wick substantially perpendicular to a top of the body, the connection dividing the top of the body into a first top part and a second top part where the ratio between the first top part and the top of the body corresponds to the ratio between the first time and the time period and connecting a top of the lower wick substantially perpendicular to a bottom of the body, the connection dividing the bottom of the body into a first bottom part and a second bottom part where the ratio between the first bottom part and the bottom of the body corresponds to the ratio between the second time and the time period, and displaying the candlestick.

In accordance with an aspect of the present invention, a computer implemented method includes modifying a display of a candlestick representative of a price range of a market traded security during a time period where the candlestick includes a body and at least one of an upper wick and lower wick, the body having a width and height where the width is representative of the time period and the height is representative of a range between an open price and a close price during the time period, the upper wick having a centerline projecting from a top of the body having a height representative of a high price at a first time during the time period and the lower wick having a centerline projecting from a bottom of the body having a height representative of a low price at a second time during the time period by a charting engine generating a modified candlestick by moving the upper wick from the centerline to a connection point substantially perpendicular to the top of the body, the connection point dividing the top of the body into a first top part and a second top part where the ratio between the first top part and the top of the body corresponds to the ratio between the first time and the time period and moving the lower wick from the centerline to a connection point substantially perpendicular to the bottom of the body, the connection point dividing the bottom of the body into a first bottom part and a second bottom part where the ratio between the first bottom part and the bottom of the body corresponds to the ratio between the second time and the time period, and the charting engine displaying the modified candlestick.

In accordance with another aspect of the present invention, a computer implemented method for modifying to a user a display of a candlestick representative of a price range of a market traded security during a time period wherein the candlestick includes a body and at least one of a upper wick and lower wick, the body having a width and height wherein the width is representative of the time period and the height is representative of a range between an open price and a close price during the time period, the upper wick having a centerline projecting from a top of the body having a height representative of a high price at a first time during the time period and the lower wick having a centerline projecting from a bottom of the body having a height representative of a low price at a second time during the time period including determining whether the low price occurred before the high price during the time period, a charting engine generating a modified candlestick by at least one of a moving the upper wick to the right of the centerline to a connection point substantially perpendicular to the top of the body and moving the lower wick to the left of the centerline to a connection point substantially perpendicular to the bottom of the body if the low price occurred before the high price and at least one of a moving the upper wick to the left of the centerline to a connection point substantially perpendicular to the top of the body and moving the lower wick to the right of the centerline to a connection point substantially perpendicular to the bottom of the body if the low price occurred after the high price, and the charting engine displaying the modified candlestick visually depicting to the user whether the low price occurred before or after the high price during the time period.

In accordance with an aspect of the present invention, a computer implemented method for modifying to a user a display of a candlestick representative of a price range of a market traded security during a time period wherein the candlestick includes a body and at least one of a upper wick and lower wick, the body having a width and height wherein the width is representative of the time period and the height is representative of a range between an open price and a close price during the time period, the upper wick having a centerline projecting from a top of the body having a height representative of a high price at a first time during the time period and the lower wick having a centerline projecting from a bottom of the body having a height representative of a low price at a second time during the time period including determining whether the low price occurred before the high price during the time period, a charting engine generating a modified candlestick by at least one of a tilting a top of the upper wick clockwise and tilting a bottom of the lower wick clockwise from a pivot of the centerline if the low price occurred before the high price and at least one of a tilting a top of the upper wick counter-clockwise and tilting a bottom of the lower wick counter-clockwise from a pivot of the centerline if the low price occurred after the high price, and the charting engine displaying the modified candlestick visually depicting to the user whether the low price occurred before or after the high price during the time period.

In accordance with another aspect of the present invention, a computer implemented method for modifying to a user a display of OHLC price bar representative of a price range of a market traded security during a time period wherein the OHLC price bar includes a vertical price bar having a center point and a height representative of a range between a high price and low price during the time period including determining whether the low price occurred before the high price during the time period, a charting engine generating a modified OHLC price bar by tilting the vertical price bar clockwise from the center point of the vertical price bar if the low price occurred before the high price and tilting the vertical price bar counter-clockwise from the centerpoint of the vertical price bar if the low price occurred after the high price, and the charting engine displaying the modified OHLC price bar visually depicting to the user whether the low price occurred before or after the high price during the time period.

In accordance with an aspect of the present invention, a non-transitory computer readable medium having instructions stored thereon, the instructions configured to cause a computing device to perform operations including one or more a computer implemented methods listed above.

In accordance with another aspect of the present invention, an apparatus includes at least one computing device in communication with at least one network interface and a network, the at least one computing device adapted to read and execute the instructions stored in the non-transitory computer readable medium listed above.

BRIEF DESCRIPTION OF THE DRAWINGS

FIG. 1-A is a prior art illustration of a bullish OHLC price bar.

FIG. 1-B is a prior art illustration of a bullish candlestick.

FIG. 1-C is a prior art illustration of a bearish candlestick.

FIG. 1-D is a prior art illustration of different types of candlesticks.

FIG. 4-A is a prior art depiction of a portion of a data structure for market data such as time/sales data.

FIG. 4-B is a prior art depiction of a portion of a data structure for market data such as OHLC data.

FIG. 7-A is an illustration of enhanced candlesticks having both an upper wick and lower wick that can be generated in accordance with the present invention.

FIG. 7-B is an illustration of more enhanced candlesticks that can be generated in accordance with the present invention.

FIG. 8-A is a block diagram of a processor used to produce enhanced OHLC data in accordance with the present invention.

FIG. 8-B is a depiction of a portion of a data structure for the enhanced OHLC data in accordance with the present invention.

FIG. 11-A is an illustration of an enhanced HLC price bar that can be generated in accordance with the present invention.

FIG. 11-B is an illustration of enhanced OHLC price bars that can be generated in accordance with the present invention.

FIG. 13-A is an illustration of alternate enhanced candlesticks that can be generated in accordance with the present invention.

FIG. 13-B is an illustration of alternate enhanced OHLC price bars that can be generated in accordance with the present invention.

DETAILED DESCRIPTION OF THE INVENTION

Figure 2:
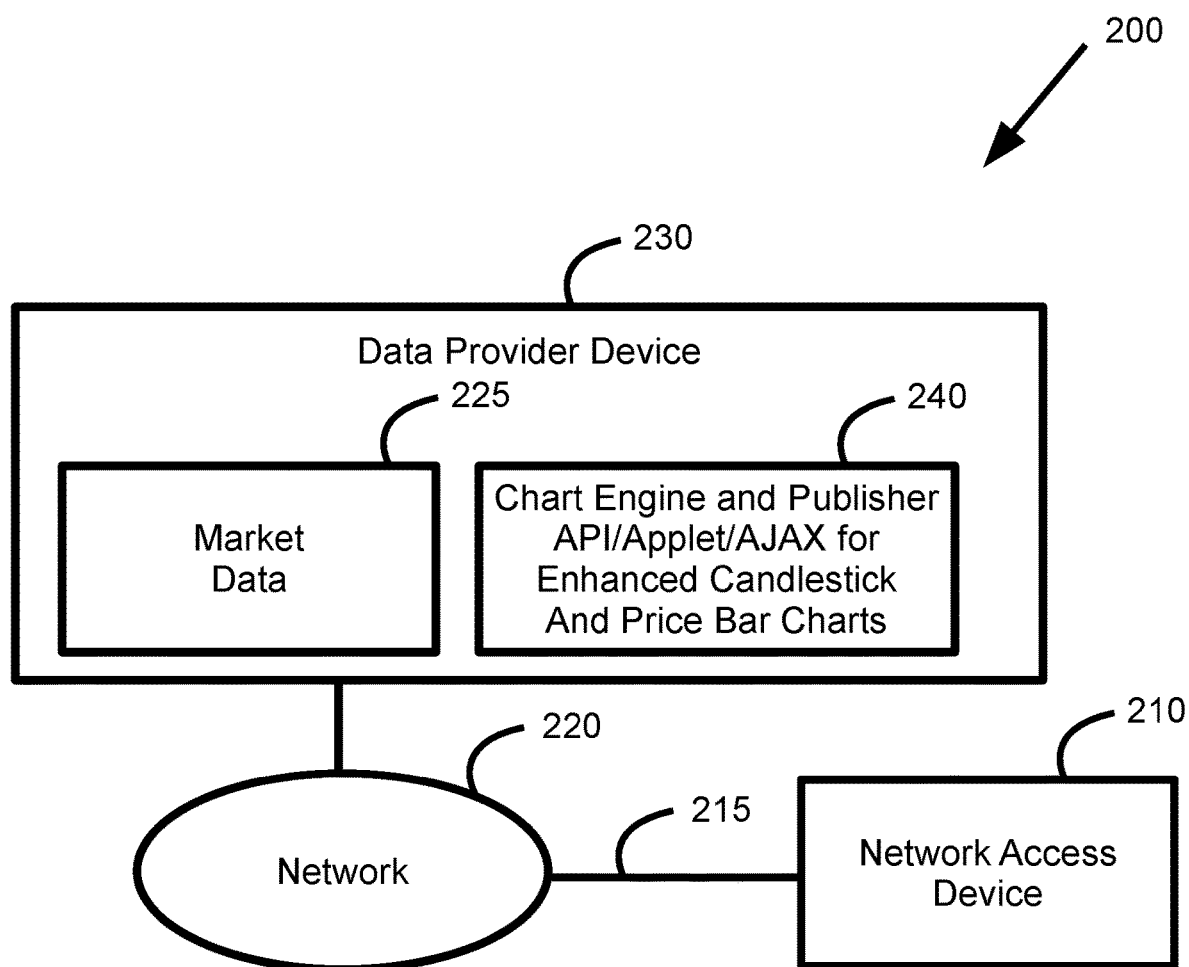
FIG. 2 is a block diagram of an exemplary distributed computer system in accordance with the present invention.

The present invention will now be described with reference to the drawings, wherein like reference numerals are used to refer to like elements throughout.

FIG. 2 illustrates an exemplary system for providing a distributed computer system 200 in accordance with one aspect of the present invention and includes one or more network access devices such as device of a user 210, connected 215 via a network 220. The network 220 may use Internet communications protocols (IP) to allow network access devices 210 communicate with each other to communicate securities, derivatives, and currencies market data 225 stored and streamed from the cloud via at least one data provider device 230, for example. Such network access devices 210 and data provider devices 230 can be configured as client/server, peer-to-peer, publish-subscribe, processing agent, ad-hoc, and the like. It is understood that a single network access device 210 and a data provider device 230 may be configured to perform both the client/server or publisher/subscriber roles.

The communication device of such network access device may include a transceiver, a modem, a network interface card, or other interface devices to communicate with the electronic network 220 and may further be operatively coupled to and/or include a Global Positioning System (GPS) via a GPS receiver (not shown). The modem may communicate with the electronic network 220 via a line 215 such as a telephone line, an ISDN line, a coaxial line, a cable television line, a fiber optic line, or a computer network line. Alternatively, the modem may wirelessly communicate with the electronic network 220. The electronic network 220 may provide an on-line service, an Internet service provider, a local area network service, a wide area network service, a cable television service, a wireless data service, an intranet, a satellite service, or the like.

Such network access devices may be hand held devices, palmtop computers, personal digital assistants (PDAs), tablets, notebook, laptop, portable computers, desktop PCs, workstations, and/or larger/smaller computer systems. It is noted that the network access devices may have a variety of forms, including but not limited to, a general purpose computer, a network computer, an internet television, a set top box, a web-enabled telephone, an internet appliance, a portable wireless device, a game player, a video recorder, and/or an audio component, for example.

Each network access device may typically include one or more memories 310, processors 315, and input/output devices 320. An input device may be any suitable device for the user to give input, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

Those skilled in the art will appreciate that the computer environment 200 shown in FIG. 2 is intended to be merely illustrative. The present invention may also be practiced in other computing environments. For example, the present invention may be practiced in multiple processor environments wherein the network access device includes multiple processors. Moreover, the network access device need not include all of the input/output devices 320 as discussed above and may also include additional devices. Those skilled in the art will appreciate that the present invention may also be practiced via Intranets and more generally in distributed environments in which a network access device requests resources from another network access device.

Figure 3:
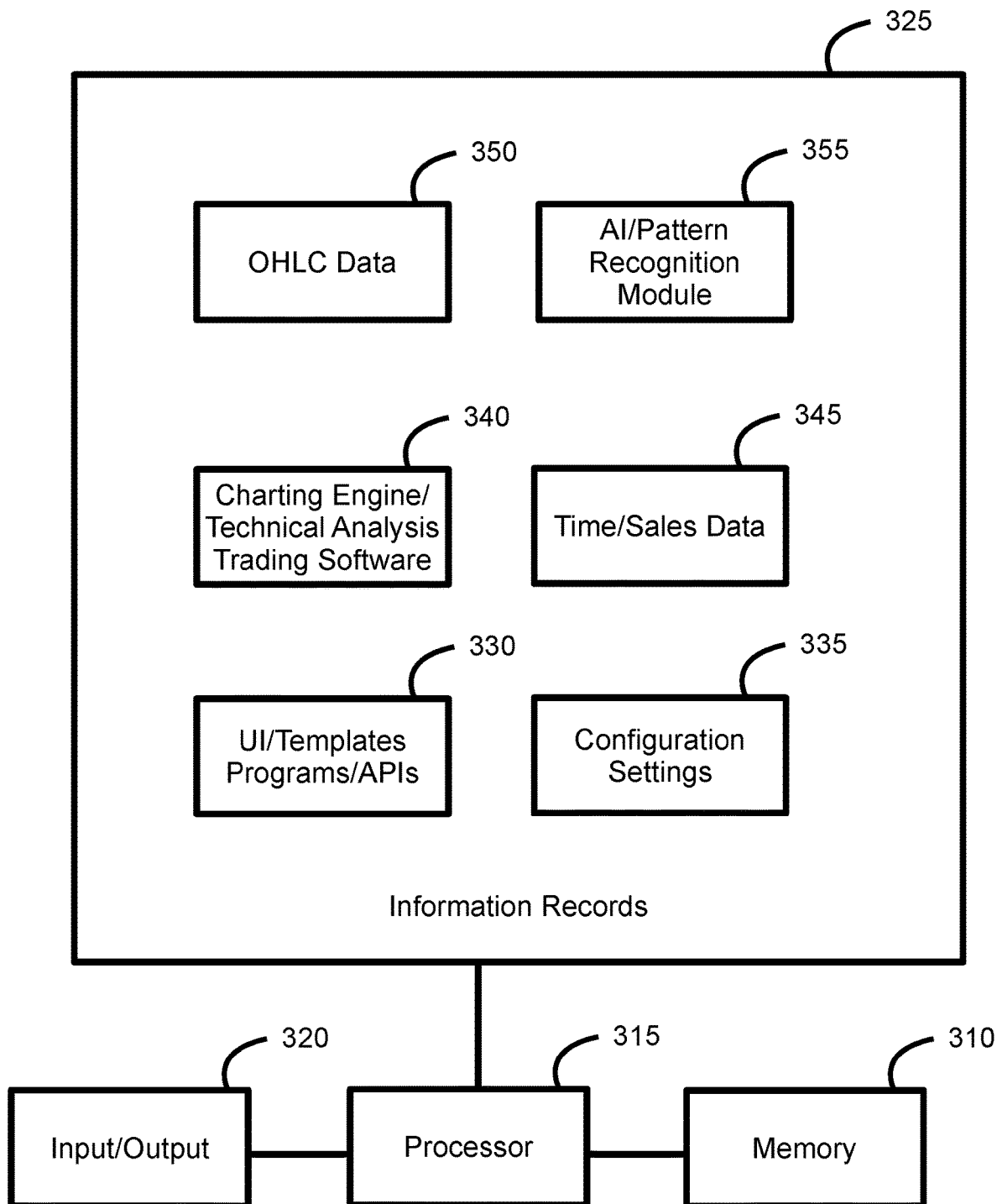
FIG. 3 is a block diagram illustrating exemplary information records stored in memory in accordance with the present invention.

FIG. 3 illustrates a block diagram of a storage device such as memory 310 in operative association with a processor 315. The processor 315 is operatively coupled to input/output devices 320 in network access devices for users and market participants of market data 225 such as traders, investors, market makers, brokers, bankers, analysts, researchers, and the like. Stored in memory 310 may be information records 325 having any combination of exemplary content such as lists, files, relational pointers, programs, interfaces, engines, modules, templates, rule sets, libraries, and databases. Such records may include for example: user interface/templates/programs/APIs (application programming interface) 330, configuration settings 335, charting engine and technical analysis module and trading software 340, time/sales data 345, OHLC data 350, and AI/pattern recognition module 355. These information records may be further introduced and discussed in more detail throughout the disclosure of this invention.

FIG. 4-A illustrates a portion of a data structure for market data 225 such as time/sales data 345. The data structure can include data fields such as a date/time 410, security or derivative symbol 415, sales price 420, size (e.g., number of shares or contracts, etc.) of the sale 425, and the exchange 430 that the sale took place.

FIG. 4-B illustrates a portion of a data structure for market data 225 such as OHLC data 350. The data structure can include data fields 440 such as a date/time 410, open price 134, high price 142, low price 150, close price 138, and volume. Each data record is representative of such data for a given time period and in turn used to represent a plurality of intratime periods within a larger given time period. For instance, each data record shows the OHLC data for a one minute interval based on the time data which can define a first intratime period 445, a second intratime period 450, a third intratime period 455, and can continue (not shown) to an endless number of intratime periods up to a last or final intratime period. For instance, if the given time period of interest is a five minute interval then five data records of one minute intervals would be used to as five intratime periods.

Those skilled in the art will appreciate that the correspondence and operative association between data fields and/or data files can take on one-to-one, one-to-many, many-to-one, and many-to-many relationships. Relationships of data structures can take the form of delimited files, lists, tables, arrays, hashes, database records, objects, trees, graphs, rings, hub-spoke, and the like.

Figure 5:
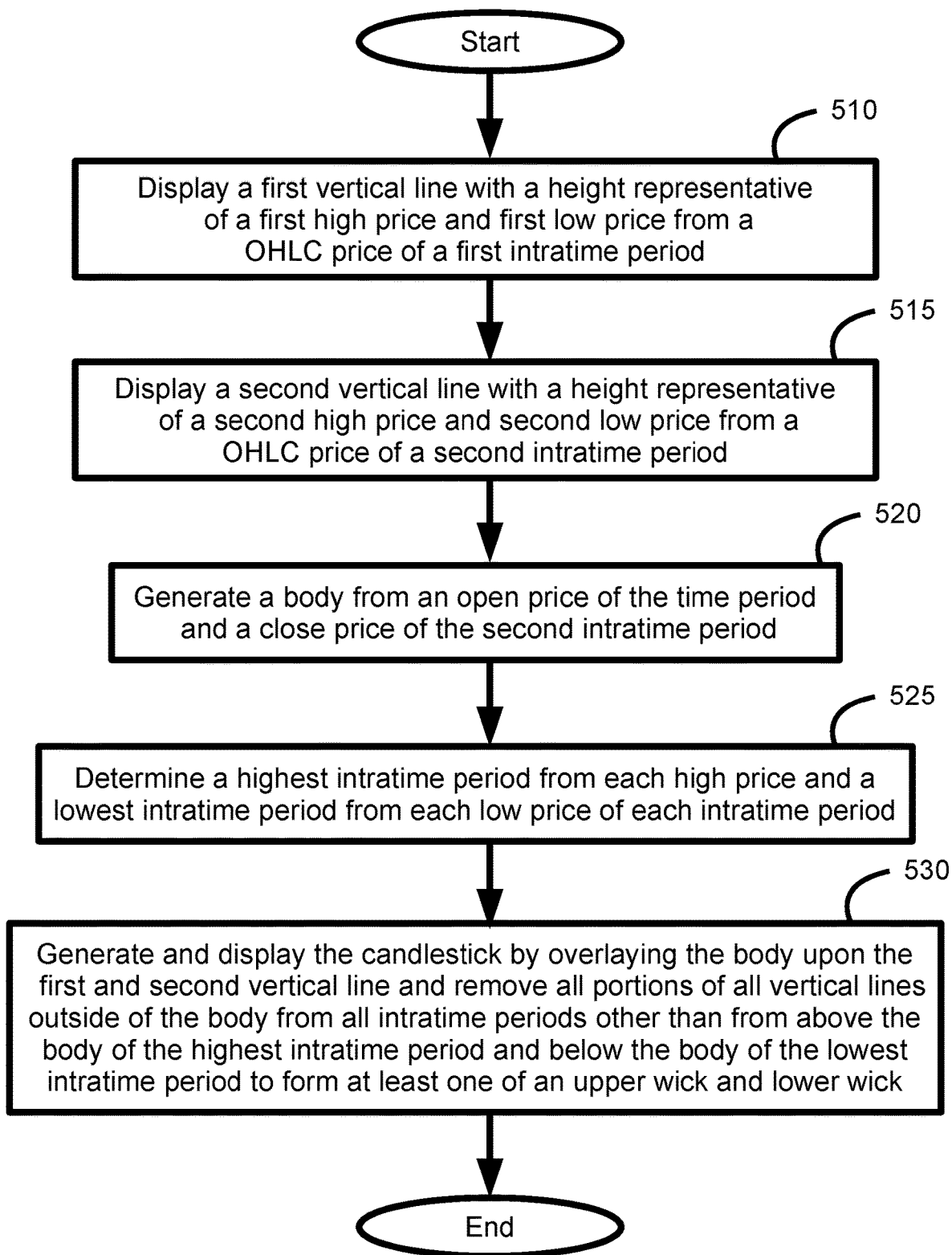
FIG. 5 is a flowchart illustrating the steps performed for processing an order in accordance with the present invention.

FIG. 5 is a flowchart illustrating the steps performed for generating and displaying a candlestick in a preferred embodiment of the present invention. When a network access device 210 receives security market data 225 including OHLC data 350 a device processor 315 in operative communication with a charting engine 340 can generate and display in step 510 a first vertical line with a height representative of a range between a first high price and first low price from the OHLC data of a first intratime period and then generate and display in step 515 a second vertical line with a height representative of a range between a second high price and second low price from a OHLC data of a second intratime period.

A body from an open price of the time period and a close price of the second intratime period can be generated in step 520 and a highest intratime period from each high price and a lowest intratime period from each low price of each intratime period can be determined in step 525. The candlestick can be generated and displayed in step 530 by overlaying the body upon the first and second vertical line and removing all portions of all vertical lines outside of the body from all intratime periods other than from above the body of the highest intratime period and below the body of the lowest intratime period to form at least one of an upper wick and lower wick, respectively.

Figure 6:
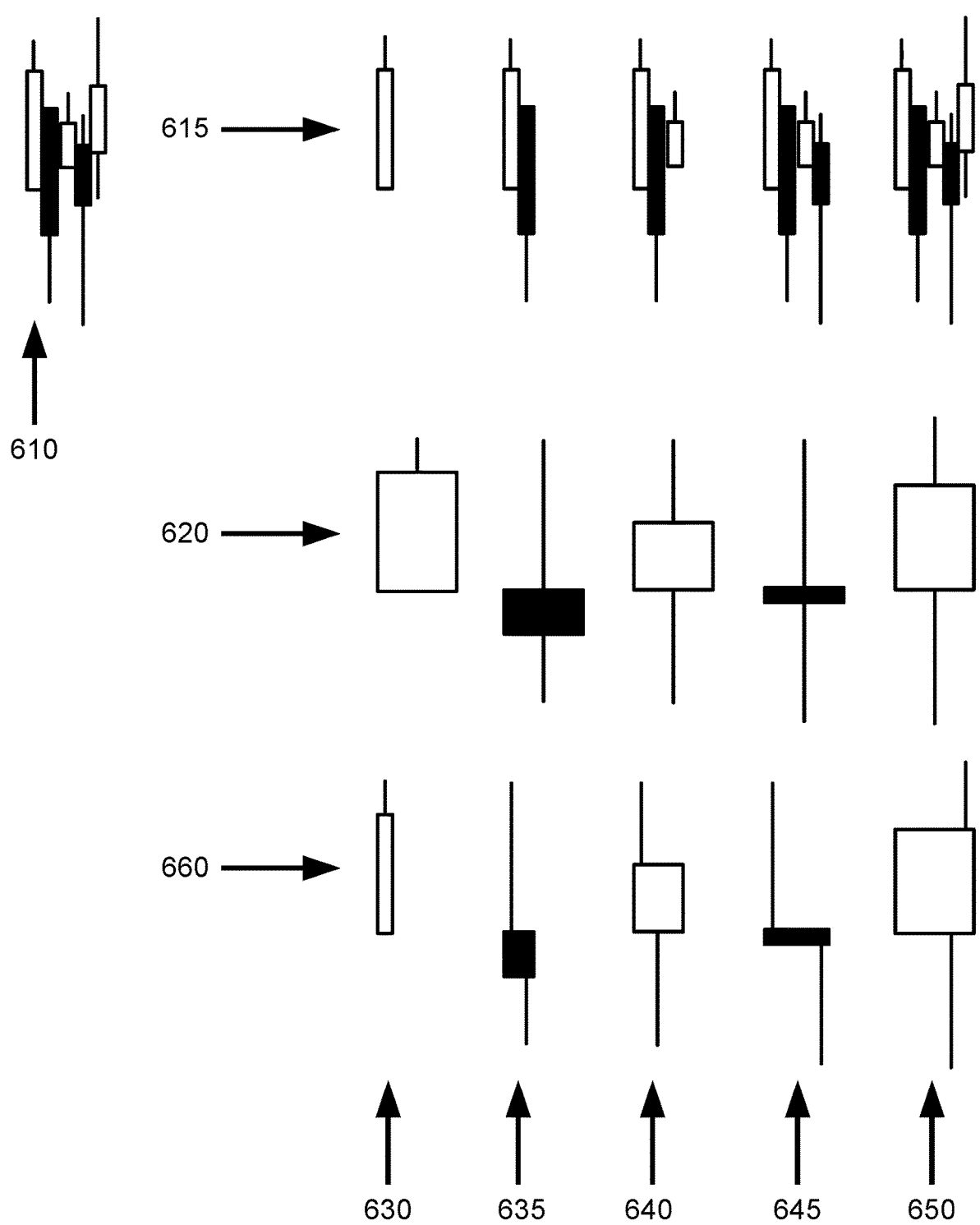
FIG. 6 is an illustration of how different kinds of candlesticks can be generated in accordance with the present invention.

FIG. 6 is an illustration of how different types of candlesticks can be generated in accordance with the present invention. A series of five OHLC prices are shown in 610 in this case shown in the form of candlesticks. For the sake of example each candlestick represents a one minute time period. The illustration shows what a prior art five minute candlestick would look like in row 620 when rendering it through known conventional techniques as each of the five OHLC prices having one minute intervals are processed. Each column represents a different one minute intratime period of the five minutes. The first column representing a first intratime period 630, a second column representing a second intratime period 635, a third column representing a third intratime period 640, a fourth column representing a fourth intratime period 645, and a fifth column representing a fifth intratime period 650.

Adjacent to the right of the five one minute candlesticks 610 shown in aggregate are the progressive sequence 615 of the same candlesticks shown as each intratime period passes. For instance, after the second intratime period 635 one can view the first two one minute candlesticks in the series of five candlesticks 610, after the third intratime period 640 one can view the first three one minute candlesticks in the series of five candlesticks 610 and so forth. One can observe the changing height of the prior art single five minute candlestick shown in row 620. In all cases the single candlestick has the same fixed width body and includes a centerline for displaying upper and lower wicks similar to how all known charting programs would render candlesticks from OHLC prices. The other drawback is that there is no way to tell how much of the five minute period has progressed from viewing the prior art candlestick.

However, a clear distinction can be shown in the last row 660, as each intratime period progresses (630, 635, 640, 645, 650) the width of the candlestick widens as wide as the width of the current and prior intratime periods rather than being a fixed width during the entire five minute time period as shown above. This gives a user a visual sense of how much time has passed during the five minute time period. The other exemplary distinction in accordance with the present invention is that the widening candlestick shows more accurately when the high price or low price has occurred based on rendering the upper wick in the highest known intratime period and the lower wick in the lowest known intratime period. By modifying where the wicks are positioned along the body width of the candlestick provides more specific information as to when a high and low price have occurred without adding any additional graphic information.

The steps as shown in FIG. 5 can be repeated for a plurality of intratime periods for the given time period. By so doing, a widening candlestick can be dynamically generated and displayed (see 660) by repetitively displaying a current vertical line from a OHLC data of a current intratime period adjacent to all prior generated vertical lines of all prior intratime periods and repetitively generating a current body and at least one of a current upper wick and lower wick where the width of the current body is equal to the sum of the width of the current intratime period and each width of all the prior intratime periods. This can continue until a final candlestick is generated and displayed having a final body and at least one of a final upper wick and lower wick where the width of the final body is equal to the width of the time period in this case a five minute time period having five one minute intratime periods.

For example, a user may wish to view a chart rendering candlesticks in one hour intervals having access to one minute OHLC data where the body is sixty pixels wide. All known charting programs will take an hour to change the shape of a candlestick having a sixty pixel wide body once each minute. However, by employing the methods of the instant invention, a new vertical line one pixel wide is drawn each minute representing the high/low price range of an intratime period. So after thirty minutes, the candlestick generated will be thirty pixels wide because of the thirty vertical lines drawn adjacent to each other in succession with a thirty pixel wide body overlayed and all pixels removed to leave in place the upper and lower wick in their respective columns to visually indicate when the highest price and lowest price during the thirty minutes had been discovered. In this example, it could be determined at the end of the time period that the high price occurred at the tenth minute of the hour in the tenth intratime period and a low price occurred at the twenty fifth minute of the hour in the twenty fifth intratime period and as a result an upper wick would be displayed in the tenth pixel column representative of the tenth intratime period and the lower wick would be displayed in the twenty fifth pixel column representative of the twenty fifth intratime period.

If there are price gaps between two adjacent vertical lines they can get filled when the body is overlayed across those lines. In a bullish candle where the close price is higher than the open price, the body is filled white to remove all pixels inside the body frame. Most of the body is already technically drawn because each column of pixels representing each vertical line for each intratime period are drawn adjacent to each other. Further a given time period and/or intratime period can scale from the execution of a single sale price known as tick data to a batch or group of ticks data to an interval of a second to seconds or minute to minutes or hour to hours or day to days or week to weeks or month to months or year to years and beyond.

In the alternative, if dynamic generation of a widening enhanced candlestick requires too much computing resources then configuration settings 335 can be used to only display the final enhanced candlestick at the end of the last intratime period which is the same time as the end of the time period itself. So it is possible to show prior art centerline candlesticks corresponding to price changes during the time period before showing the permanent final enhanced candlestick representative of the whole time period at the end of the time period.

FIG. 7-A is an illustration of enhanced candlesticks having both an upper wick and lower wick that can be generated in accordance with the present invention. In the simplest example take a given time period of 2 minutes using one minute OHLC data, the following are basic examples of what an enhanced candlestick that includes both an upper wick and lower wick can look like. A new enhanced candlestick called a Morning Candle 710 can be formed when both a high price and low price is found in a first intratime period. A new enhanced candlestick called a Falling Candle 715 can be formed when a high price is found in a first intratime period and a low price found in the second intratime period. A new enhanced candlestick called a Rising Candle 720 can be formed when a low price is found in a first intratime period and a high price found in the second intratime period. A new enhanced candlestick called an Evening Candle 710 can be formed when both a high price and low price is found in the second intratime period. As the intratime periods increase so do the number of combinations of new enhanced candlesticks that can be generated. Configuration settings 335 can be used to provide options whether the upper and lower wicks are displayed at the start, middle, or end of the intratime period. For instance, the middle was selected for both upper and lower wicks the wick lines would render at either the 25% or the 75% along the width of the body.

FIG. 7-B is an illustration of more enhanced candlesticks that can be generated in accordance with the present invention. Now that it is shown how and why wicks of candlesticks can be moved to create enhanced candlesticks that more accurately indicate when a high price and low price has occurred in a given time period a closer look at prior art candlesticks can be reviewed and shown how they can be enhanced to create newer types of candlesticks. For instance the Hanging Man 170 can broaden into at least two new enhanced candle sticks such as an Early Hanging Man 730 and a Late Hanging Man 735 or a Shooting Star 175 can broaden into at least two new enhanced candlesticks such as a Morning Shooting Star 740 and an Evening Shooting Star 745 or a Dragonfly Doji 180 can broaden into at least two new enhanced candlesticks such as a Morning Dragonfly Doji 750 and an Evening Dragonfly Doji 755 or a Gravestone Doji 185 can broaden into at least two new enhanced candlesticks such as a Morning Gravestone Doji 760 and an Evening Gravestone Doji 765 or lastly, a Long-Legged Doji 190 can broaden into at least two new enhanced candlesticks such as a Falling Long-Legged Doji 770 and a Rising Long-Legged Doji 775. One can visually see why such Long-Legged Dojis would be described as Falling and Rising respectively as they visually depict whether the high price or low price came first and serve as more of a leading indicator as to the degree or nature of indecision that is typically attributed to Doji type candlesticks.

Those skilled in the art will appreciate that scores of enhanced candlesticks can be named by the use of the techniques described in this instant invention which may offer greater degree of granularity and insight toward those speculators applying technical analysis of trends and reversals based on such new visual information. Further, a single enhanced candlestick can serve as a visual summary or substitute for more complex conventional candlestick patterns of a plurality of candlesticks across multiple intratime periods.

FIG. 8-A is a block diagram of a processor used to produce enhanced OHLC data in accordance with the present invention. A device processor 315 can receive time/sales data 345 and parse through all sales for a given time period. The first sale of the period is the open price and last sale of the period is the close price. After all sales are parsed it can be determined which sale at what time had the highest price as well as which sale at what time had the lowest price. OHLC data 350 of prior art is usually produced this way from time/sales data. However such OHLC data 350 format only discloses price and volume for a time period and neglects to include the absolute time of the high and low price and also neglects to include a percentage of time relative to the time period of the high and low price. Enhanced OHLC data 810 can be generated by the processor and stored to include the absolute time of the highest price and absolute time of the lowest price for the time period which can be stored as a data record or delimited list. Newly packaged enhanced OHLC data makes adoption to enhanced candlestick charts quicker and easier.

When time/sales data is not available, enhanced OHLC data 810 can also be generated by the processor 315 from known OHLC data 350. For instance, investors may not be as concerned with hourly price fluctuations and might only wish to chart a security with daily OHLC data. Since there are three hundred ninety minutes in a trading day, the processor 315 can parse through intraday OHLC data in one minute intervals to determine which minute of the day had the highest price and which intratime period of the day had the lowest price. In one example, those intratime periods can be coded as values of daily percentage of time of the high price and daily percentage of time of the low price which could be stored as part of the enhanced OHLC daily data 810.

FIG. 8-B is a depiction of a portion of a data structure for the enhanced OHLC data in accordance with the present invention. Additional fields such as time of high price 820, time of low price 825, high price time percentage 830, and low price time percentage 835 can be generated as referenced above and included in the data structure to enhance OHLC data 810. Each record shows an absolute time and can also include percentage of time relative to the intratime period to make it quicker and easier for charting engines to generate enhanced candlesticks as referenced throughout this instant invention.

Figure 9:
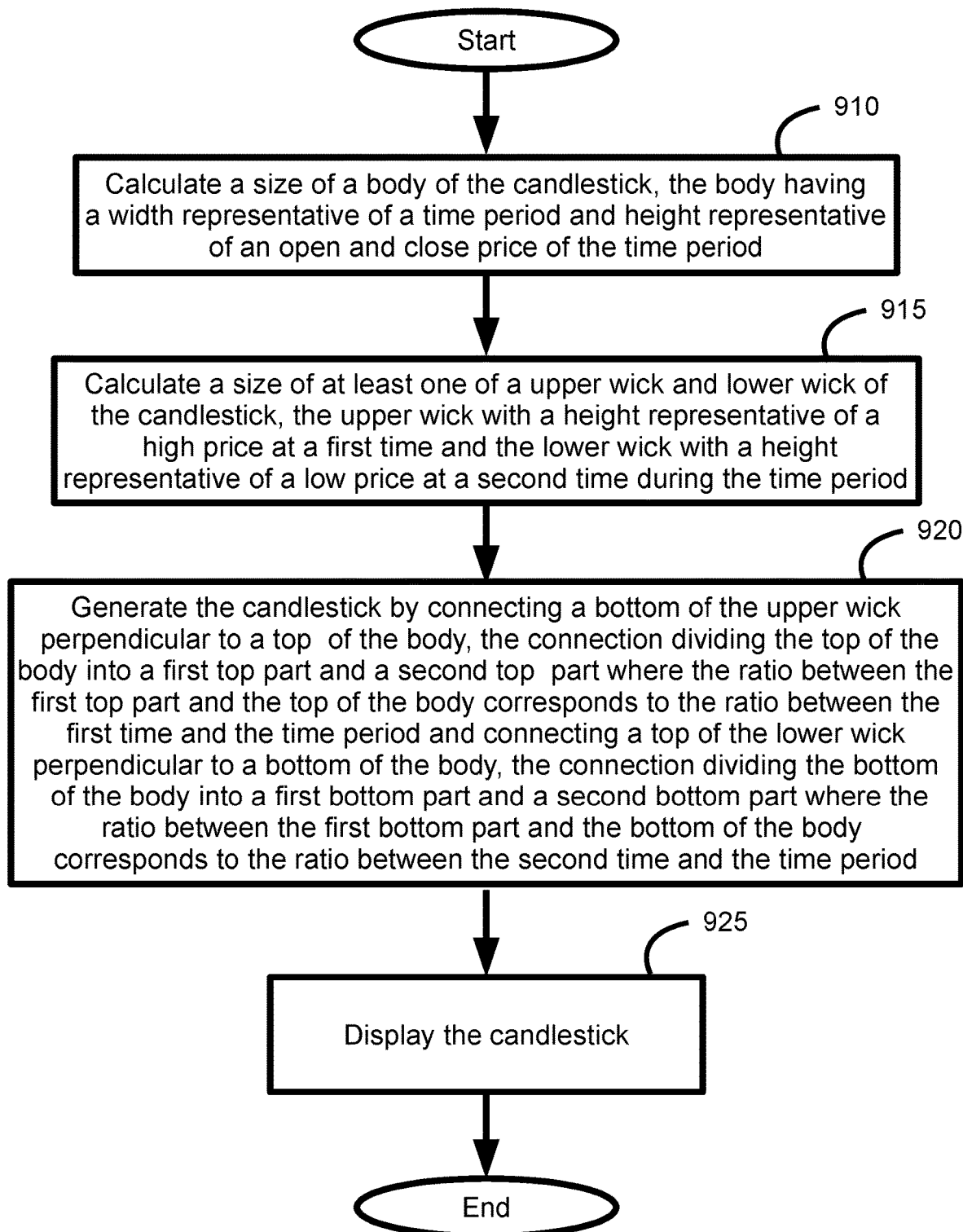
FIG. 9 is a flowchart illustrating the steps performed for generating and displaying a candlestick in accordance with the present invention.

FIG. 9 is a flowchart illustrating the steps performed for generating and displaying a candlestick in accordance with the present invention. When a network access device 210 receives security market data 225 including enhanced OHLC data 810 a device processor 315 in operative communication with a charting engine 340 can calculate in step 910 a size of a body of the candlestick, the body having a width and height where the width is representative of the time period and the height is representative of a range between an open price and a close price during the time period and calculate in step 915 a size of at least one of an upper wick and lower wick of the candlestick, the upper wick having a height representative of a high price at a first time during the time period and the lower wick having a height representative of a low price at a second time during the time period. After such calculations the candlestick can be generated in step 920 by connecting a bottom of the upper wick substantially perpendicular to a top of the body, the connection dividing the top of the body into a first top part and a second top part where the ratio between the first top part and the top of the body corresponds to the ratio between the first time and the time period and by connecting a top of the lower wick substantially perpendicular to a bottom of the body, the connection dividing the bottom of the body into a first bottom part and a second bottom part where the ratio between the first bottom part and the bottom of the body corresponds to the ratio between the second time and the time period, and display in step 925 the candlestick.

Figure 10:
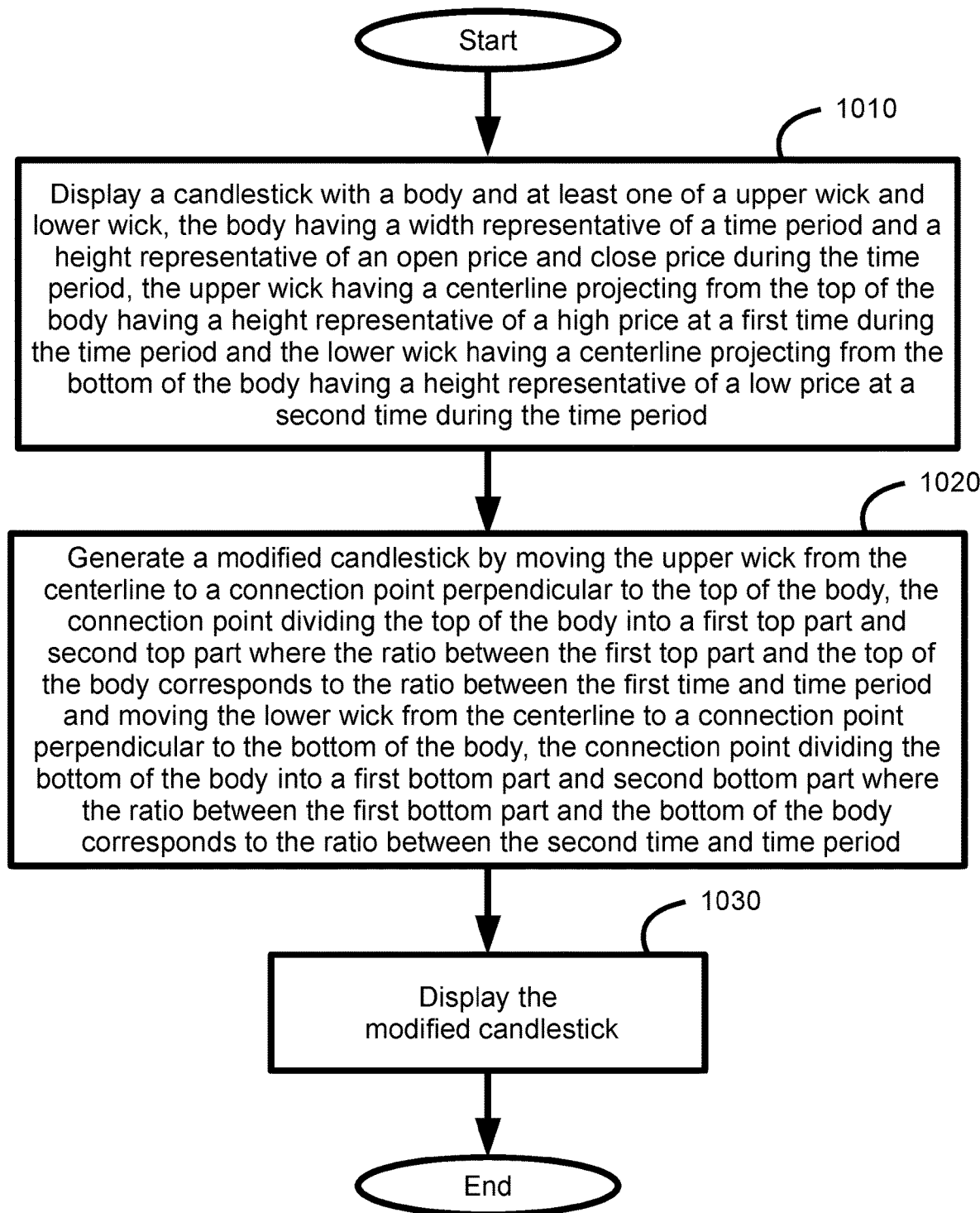
FIG. 10 is a flowchart illustrating the steps performed for generating or modifying the display of a candlestick in accordance with the present invention.

FIG. 10 is a flowchart illustrating the steps performed for modifying the display of a candlestick in accordance with the present invention. When a displayed candlestick is identified in step 1010 with a body and at least one of a upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period the modified candlestick can be generated in step 1020 by moving the upper wick from the centerline to a connection point substantially perpendicular to the top of the body, the connection point dividing the top of the body into a first top part and second top part where the ratio between the first top part and the top of the body corresponds to the ratio between the first time and time period and moving the lower wick from the centerline to a connection point substantially perpendicular to the bottom of the body, the connection point dividing the bottom of the body into a first bottom part and second bottom part where the ratio between the first bottom part and the bottom of the body corresponds to the ratio between the second time and time period. The modified candlestick can then be displayed in step 1030.

Unlike conventional candlesticks that display the wick(s) along a centerline vertical axis one hundred percent of the time, the freedom of the instant invention to move the upper and lower wicks along the body of the candlestick would make enhanced candlesticks with wick(s) along a centerline vertical axis rare and could only happen when either or both of the high price and low price occur near or around half of the given time period.

Though it is generally preferred that the wicks are displayed vertical the term substantially perpendicular is used to allow for alternate aspects of the instant invention. The wicks can be adapted to be slightly rotated or tilted forward or backward to indicate price direction or momentum during the time period or near the time of the high price or low price. Further, tilting each wick along the centerline of a conventional candlestick can indicate which of a high price and low price had occurred first during the time period. The degree a tilt or rotational can be proportional to the length of time between the occurrence of the high and low price within the given time period.

There are different types of market data available used to render and display an enhanced candlestick chart such as real time streaming live data when a given market is open and historical data used for research, technical analysis, and backtesting. Enhanced OHLC data 810 will be particularly useful for historical data to enable users to visualize enhanced candlesticks over longer time periods spanning years or decades if need be.

The methods shown above can be employed from points of view of publisher/provider and subscriber/user. For instance, the data provider device 230 of a publisher can receive a request to download an enhanced candlestick chart data feed and send a flash object that includes the enhanced candlestick chart to the network access device 210 of a user or subscriber that can be opened and displayed in a browser or embedded into an electronic document. Further, the network access device 210 could store in memory an enhanced candlestick price chart display applet that runs in a standard Java virtual machine (JVM) executing within a browser or make API calls to receive real time streaming enhanced OHLC data 810 and/or enhanced candlestick chart publishing data from the charting engine of the data provider device. Further API connections 330 can integrate a real time streaming enhanced candlestick chart or OHLC price bar chart module directly with brokerage trading software including trading portfolios, order management systems, and accounting systems.

Such enhanced OHLC data flow can be operatively communicated between publisher/provider and subscriber/user via a Hyper Text Transfer Protocol (HTTP) based query that can utilize a Hyper Text Markup Language (HTML), an eXtensible Markup Language (XML), Dynamic-HTML (DHTML), Asynchronous JavaScript and XML (AJAX), JavaScript, Applets, or some other suitable communication protocol or content format.

Due to the expanded visual symbol set of unique enhanced candlesticks, a chart pattern recognition and analysis module 355 can be applied upon enhanced candlestick, OHLC price bar, or HLC price bar sequences of varying pattern length and use Artificial Intelligence type (AI) deterministic algorithms including machine learning algorithms, Bayesian networks, neural networks, or fuzzy systems. In some embodiments, any number of stochastic algorithms may be implemented including: genetic algorithms or Monte Carlo algorithms. By applying such methods, greater insight can be revealed as to the greater likelihood of the next type of enhanced candlestick or price bar that could occur in a current unfolding sequence or progression of emerging enhanced candlestick patterns.

The present invention includes dynamically generating and displaying a widening candlestick by repetitively displaying a current vertical line from a OHLC data of a current intratime period adjacent (to the right) to all prior displayed generated vertical lines of all prior intratime periods and repetitively generating a current body and at least one of a current upper wick and lower wick wherein the width of the current body is equal to the sum of the width of the current intratime period and each width of all the prior intratime periods and further includes generating and displaying a final candlestick having a final body and at least one of a final upper wick and lower wick wherein the width of the final body is equal to the width of the time period. The invention can further include generating OHLC data in real time after each intratime period from time/sales data streamed during the intratime period and determining from configuration settings 335 whether at least one of an upper and lower wick is displayed at either the start, middle, or end of the width of the body for each intratime period or time period. A time period can range from a fraction of a second to decades.

All the techniques of using the width of a candle body as an intratime axis to proportionately shift the display of upper and lower wicks as well as the dynamic generation techniques of widening the candle body for each intratime period can be applied to HLC and OHLC price bars and charts as well.

FIG. 11-A is an illustration of an enhanced HLC price bar that can be generated in accordance with the present invention. The illustration visually compares the prior art of FIG. 1-A, where an OHLC bar has a single vertical line 110 that shows the high price 114 and the low price 118 of a time period with the open price 122 marked by a tick mark on the left of the vertical line 110, and the close price 126 marked by a tick mark on the right of the vertical line 110. This prior art chart is of a price axis only for a discrete interval of time during a time period. Rather than using the vertical line centric to showing OHLC it can be appreciated that the new HLC price bar 1100 of the instant invention splits the vertical high-low price line into two separate vertical lines of a high price bar 1110 and a low price bar 1115 both of which connect and centric to a horizontal close price bar 1120 the length of which serving as an intratime axis for the time period so that a user viewing this new HLC bar can ascertain when the high price bar 1110 and low price bar 1115 have respectively occurred during the time period. Optionally a tick mark for an open price (not shown) could be drawn in this case to the left of the low price bar 1115 and turn the enhanced HLC price bar 1100 into an enhanced OHLC price bar.

FIG. 11-B is an illustration of enhanced OHLC price bars that can be generated in accordance with the present invention. A similar technique that was applied toward enhancing and changing the function of HLC price bars can also be applied toward enhancing OHLC price bars (1130, 1160). The new OHLC price bar 1130 of the instant invention splits the vertical high-low price line into two separate vertical lines of a high price bar 1140 and a low price bar 1145 both of which connect and centric to a new open-close price bar 1150 the length of which serving as an intratime axis for the time period so that a user viewing this new OHLC bar can ascertain when the high price bar 1140 and low price bar 1145 have respectively occurred during the time period. The open-close price bar 1150 is drawn as a rising diagonal in this case. This diagonal bar would be the same length and angle as if it served as a diagonal of a candle body (not shown) representative of the height between the open price and close price and the width of the time period. Another new OHLC price bar 1160 also splits the vertical high-low price line into two separate vertical lines of a high price bar 1170 and a low price bar 1175, in this case the high connects perpendicular to a horizontal close price bar 1180 and the low price bar 1175 connects perpendicular to a horizontal open price bar 1185. An additional connecting bar 1190 is drawn to connect the intersection of the low-open price bars (1175, 1185) with the high-close price bars (1170, 1180). The connecting bar 1190 illustrates the overall price flow during the time period in between high and low price events.

Figure 12:
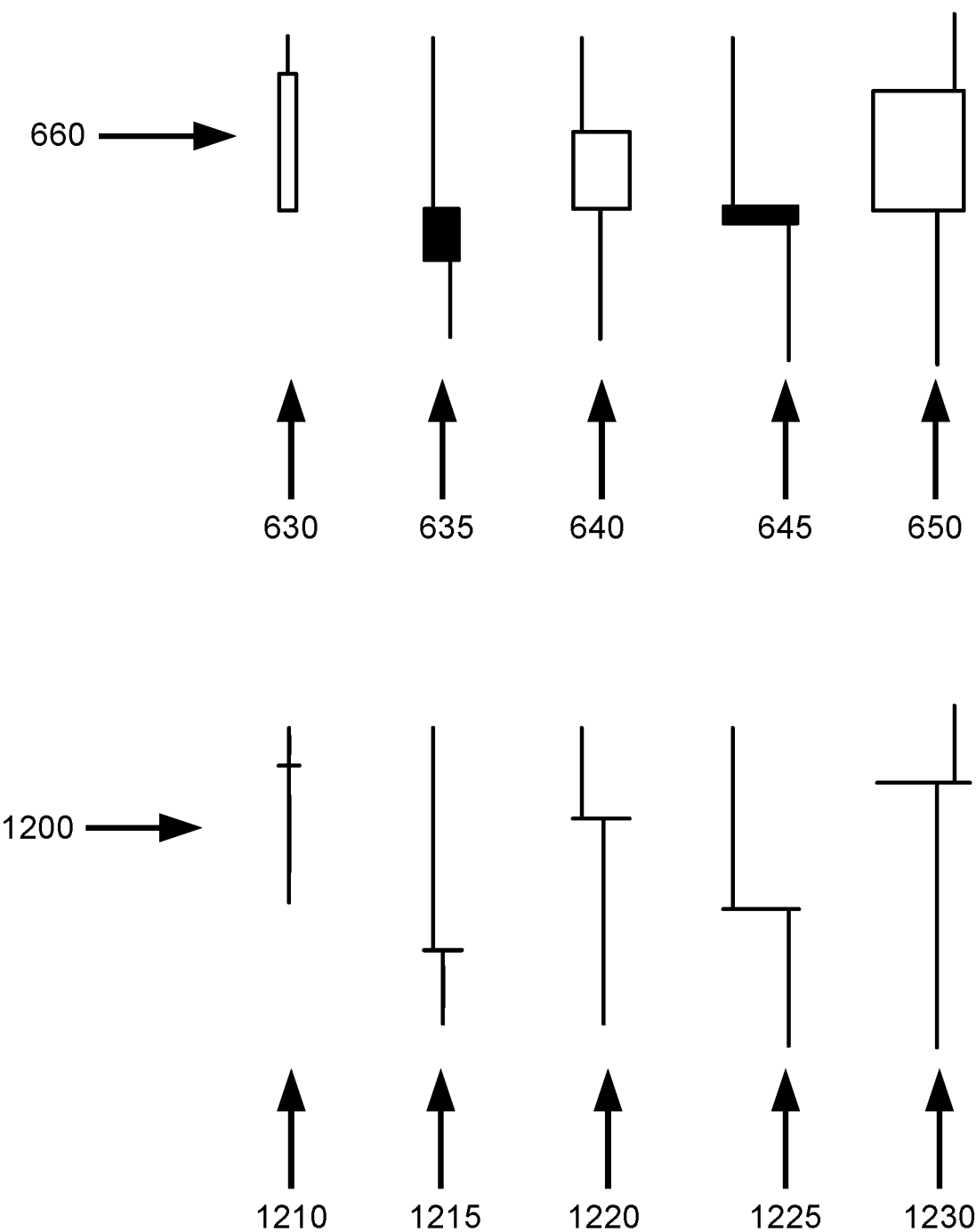
FIG. 12 is an illustration of enhanced OHLC price bars that can be dynamically generated in accordance with the present invention.

FIG. 12 is an illustration of enhanced OHLC price bars that can be dynamically generated in accordance with the present invention. Similar to how row 660 of FIG. 6, shows the progression of each intratime period (630, 635, 640, 645, 650) where the width of the candlestick widens as wide as the width of the current and prior intratime periods during the entire time period, such to does row 1200 show the progression of each intratime period (1210, 1215, 1220, 1225, 1230) of enhanced HLC price bars where the width of the horizontal close bar progressively widens during the time period giving a user a visual sense of how much time has passed during the time period. The other exemplary distinction in accordance with the present invention is that the widening horizontal close bar shows more accurately when the high price or low price has occurred based on rendering the upper price bar in the highest known intratime period and the lower price bar in the lowest known intratime period. By modifying where the vertical price bars are positioned along the horizontal close bar provides more specific information as to when a high and low price have occurred during the time period without adding any additional graphic information. Such generation techniques can also apply to real time dynamic generation of enhanced OHLC price bars (1130, 1160). For instance, the size and angle of the open-close price bar 1150 can dynamically change in relation to the difference between open price and close price for each intratime period during the time period.

FIG. 13-A is an illustration of alternate enhanced candlesticks that can be generated in accordance with the present invention. Though it has been shown a best mode for carrying out the instant invention with candlesticks are to use the width of the candle body as an intratime axis of a time period to more precisely break up the single centerline wick into an upper wick and lower wick that can be shifted along the candle body, that level of detail or granularity might not be needed particularly in the case of sparse computing resources. In this case, alternate candlesticks can also visually depict which came first, the high price or the low price in a given time period. Alternate enhanced candlestick 1310 shows how only the upper wick is shifted to the right which is enough to signify that the low price came first. Alternate enhanced candlestick 1315 shows how only the upper wick is tilted/rotated to the right which is enough to signify that the low price came first. Alternate enhanced candlestick 1320 shows how the centerline wick that represents both the depiction of an upper wick and lower wick is shifted clockwise can visually signify to the user that the low price came first. It of course would be apparent that shifting the centerline counter-clockwise would signify that the high price came first (not shown).

FIG. 13-B is an illustration of alternate enhanced OHLC price bars that can be generated in accordance with the present invention. Though it has been shown a best mode for carrying out the instant invention with OHLC price bars are to use the width of a price bar spanning from the open price to close price as an intratime axis of a time period to more precisely break up the single centerline high-low price bar into an upper price bar and lower price bar that can be shifted along the open-close price bar, that level of detail or granularity might not be needed particularly in the case of sparse computing resources. In this case, alternate OHLC price bars can also visually depict which came first, the high price or the low price in a given time period. Alternate enhanced OHLC price bar 1330 shows how only the upper price bar representative of the high price is shifted to the right which is enough to signify that the low price came first. Alternate enhanced OHLC price bar 1335 shows how only the upper price bar is tilted/rotated to the right which is enough to signify that the low price came first. Alternate enhanced OHLC price bar 1340 shows how the centerline high-low price bar is shifted clockwise which can visually signify to the user that the low price came first. It of course would be apparent that shifting the centerline counter-clockwise would signify that the high price came first (not shown).

Figure 14:
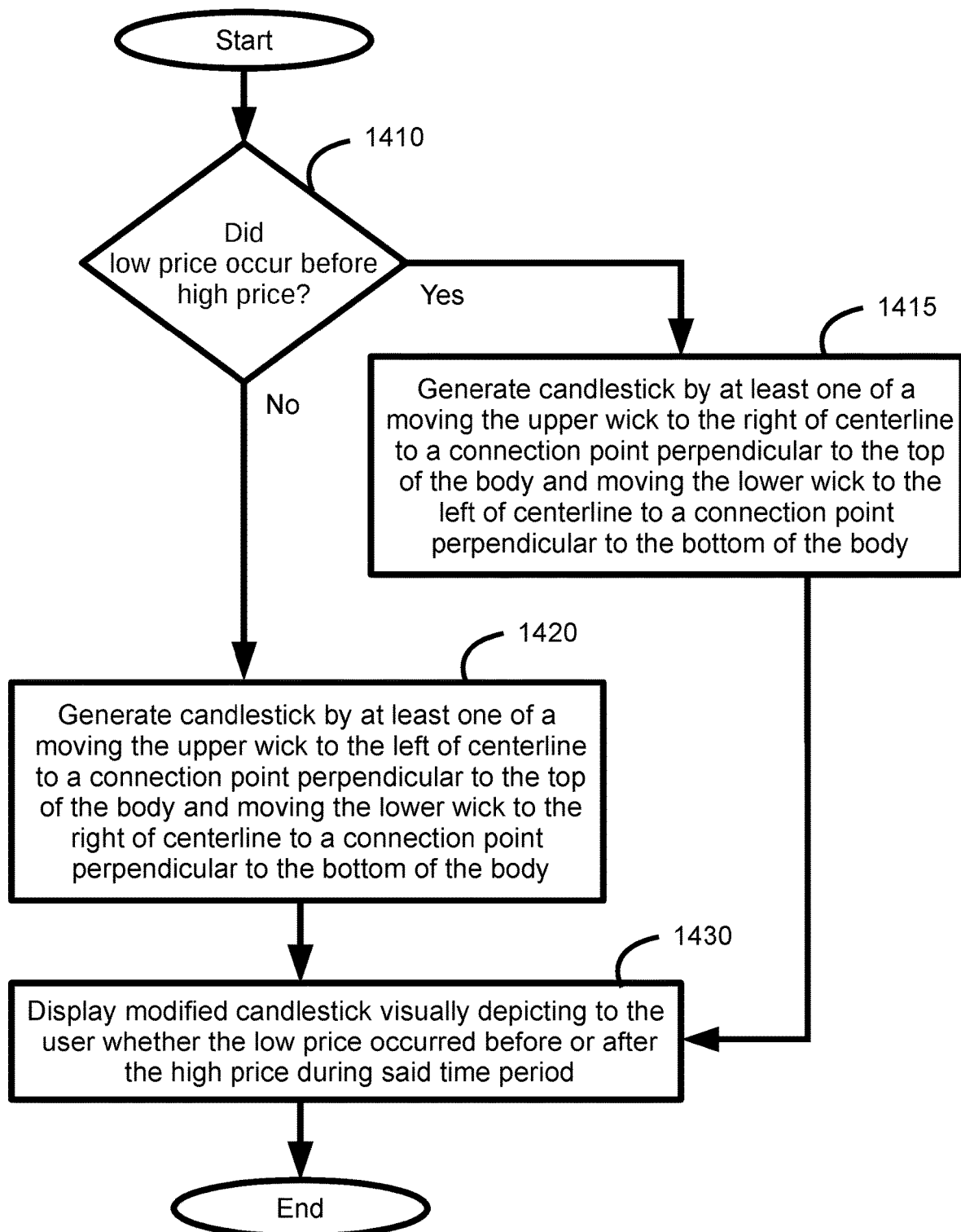
FIG. 14 is a flowchart illustrating the steps performed for generating or modifying the display of a candlestick in accordance with the present invention.

FIG. 14 is a flowchart illustrating the steps performed for generating or modifying the display of a candlestick in accordance with the present invention. When a candlestick is identified with a body and at least one of a upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period it can be determined in step 1410 whether the low price occurred before the high price during the time period. If the low price did occur first then the candlestick can be modified or generated in step 1415 by at least one of a moving the upper wick to the right of centerline to a connection point perpendicular to the top of the body and moving the lower wick to the left of centerline to a connection point perpendicular to the bottom of the body. However, if the high price occurred first then the candlestick can be modified or generated in step 1420 by at least one of a moving the upper wick to the left of centerline to a connection point perpendicular to the top of the body and moving the lower wick to the right of centerline to a connection point perpendicular to the bottom of the body. In either case, the charting engine can then display in step 1430 the modified candlestick (e.g., 1310) visually depicting to the user whether the low price occurred before or after the high price during the time period.

Figure 15:
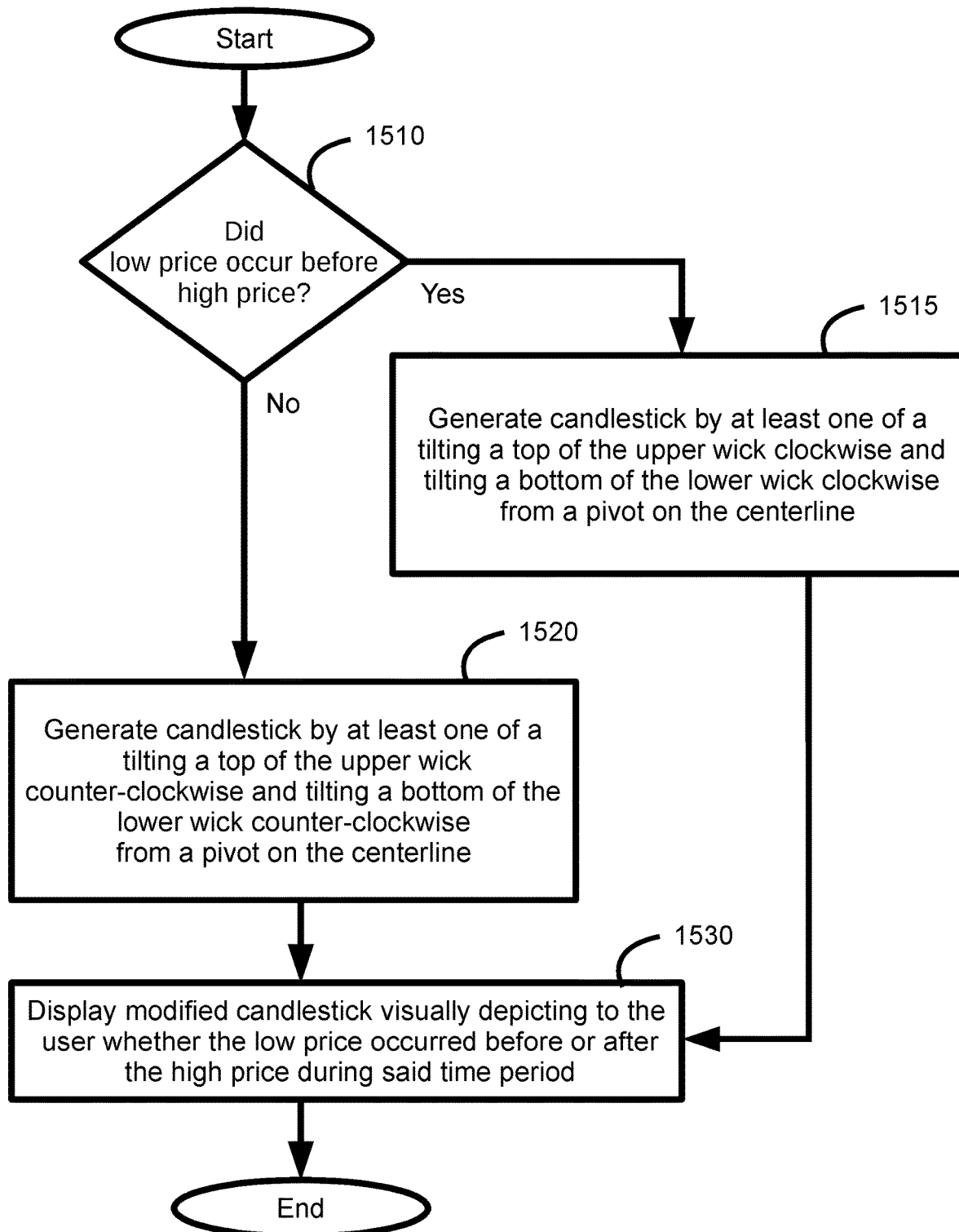
FIG. 15 is a flowchart illustrating the steps performed for generating or modifying the display of a candlestick in accordance with the present invention.

FIG. 15 is a flowchart illustrating the steps performed for generating or modifying the display of a candlestick in accordance with the present invention. When a candlestick is identified with a body and at least one of a upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period it can be determined in step 1510 whether the low price occurred before the high price during the time period. If the low price did occur first then the candlestick can be modified or generated in step 1515 by at least one of a tilting a top of the upper wick clockwise and tilting a bottom of the lower wick clockwise from a pivot on the centerline. However, if the high price occurred first then the candlestick can be modified or generated in step 1520 by at least one of a tilting a top of the upper wick counter-clockwise and tilting a bottom of the lower wick counter-clockwise from a pivot on the centerline. In either case, the charting engine can then display in step 1530 the modified candlestick (e.g., 1315, 1320) visually depicting to the user whether the low price occurred before or after the high price during the time period.

Figure 16:
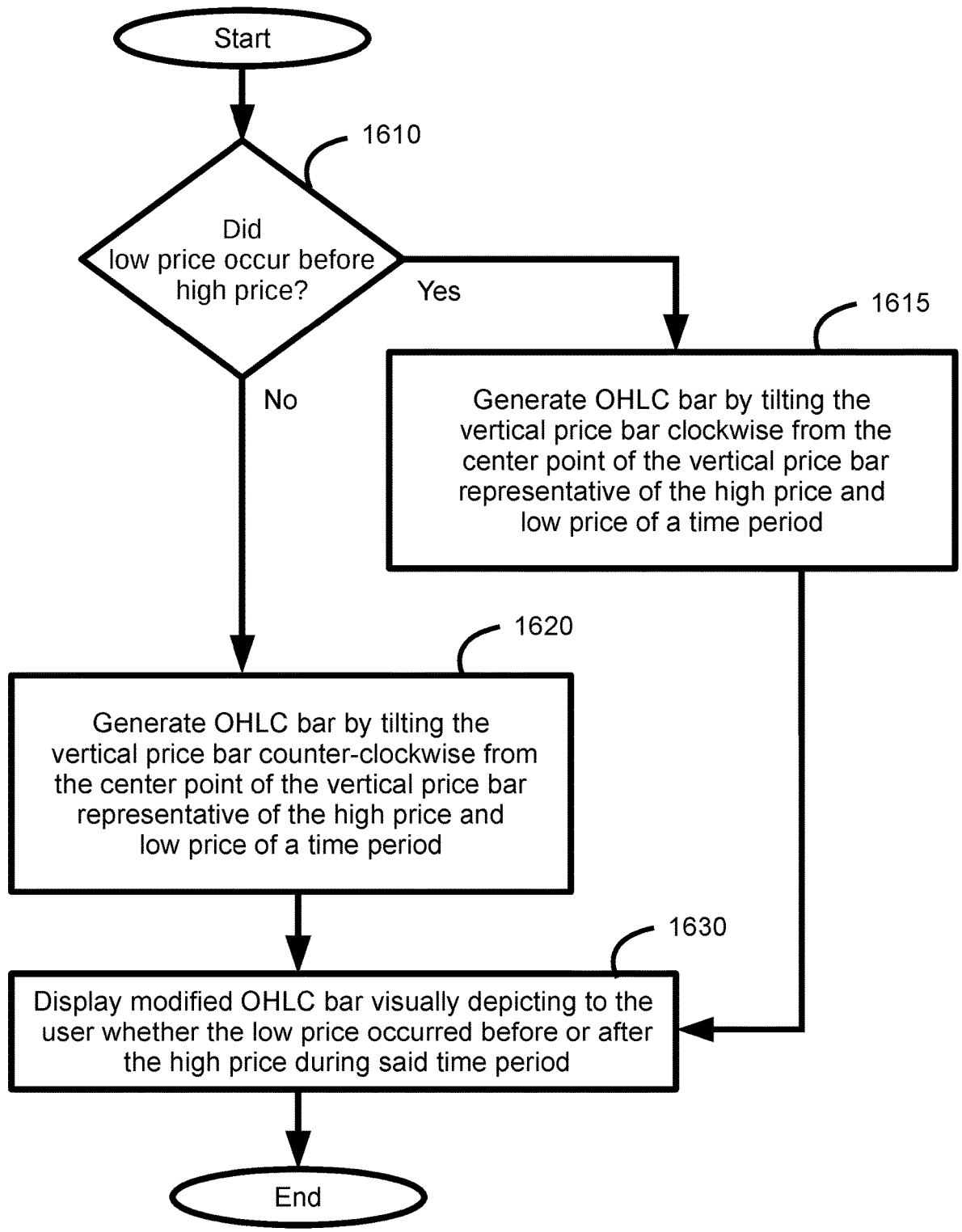
FIG. 16 is a flowchart illustrating the steps performed for generating or modifying the display of a OHLC price bar in accordance with the present invention.

FIG. 16 is a flowchart illustrating the steps performed for generating or modifying the display of a OHLC price bar in accordance with the present invention. When a OHLC price bar is identified with a vertical price bar having a center point and a height representative of a range between a high price and low price during the time period it can be determined in step 1610 whether the low price occurred before the high price during the time period. If the low price did occur first then the OHLC price bar can be modified or generated in step 1615 by by tilting the vertical price bar clockwise from the center point of the vertical price bar. However, if the high price occurred first then the OHLC price bar can be modified or generated in step 1620 by tilting the vertical price bar counter-clockwise from the center point of the vertical price bar. In either case, the charting engine can then display in step 1630 the modified OHLC price bar (e.g., 1130, 1340) visually depicting to the user whether the low price occurred before or after the high price during the time period.

Figure 17:
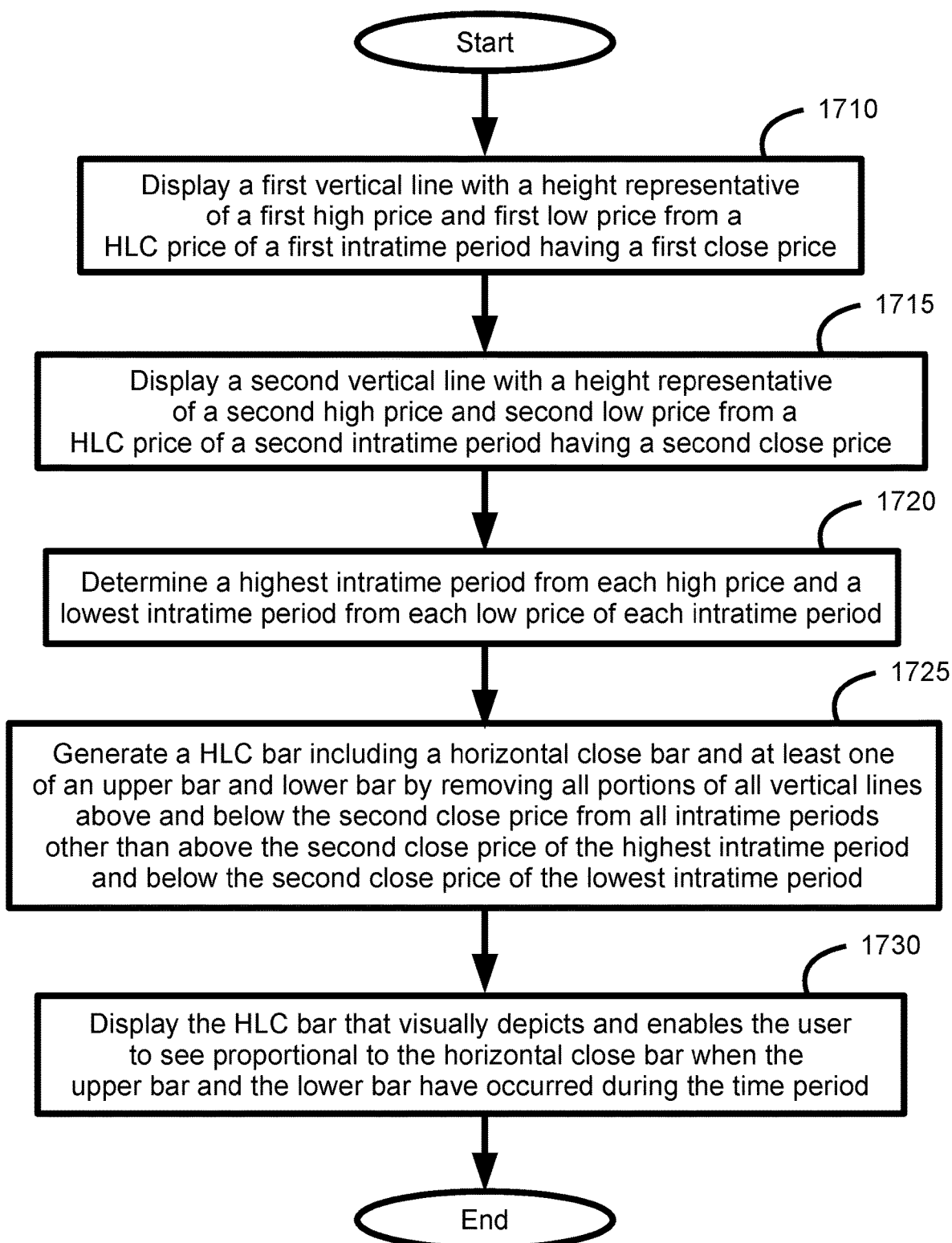
FIG. 17 is a flowchart illustrating the steps performed for generating and displaying a HLC price bar in a preferred embodiment of the present invention.

FIG. 17 is a flowchart illustrating the steps performed for generating and displaying a HLC price bar in a preferred embodiment of the present invention. When a network access device 210 receives security market data 225 including OHLC data 350 (or HLC data only if OHLC data is not available), a device processor 315 in operative communication with a charting engine 340 can generate and display in step 1710 a first vertical line with a height representative of a range between a first high price and first low price from the OHLC data of a first intratime period and then generate and display in step 1715 a second vertical line with a height representative of a range between a second high price and second low price from a OHLC data of a second intratime period.

A highest intratime period from each high price and a lowest intratime period from each low price of each intratime period can be determined in step 1720 and a HLC bar can be generated in step 1725 including a horizontal close bar and at least one of an upper bar and lower bar by removing all portions of all vertical lines above and below the second close price from all intratime periods other than above the second close price of the highest intratime period and below the second close price of the lowest intratime period. The HLC bar can then be displayed in step 1730 by the charting engine 340, the HLC bar visually depicting and enabling the user to see proportional to the horizontal close bar when the upper bar and the lower bar have occurred during the time period.

Figure 18:
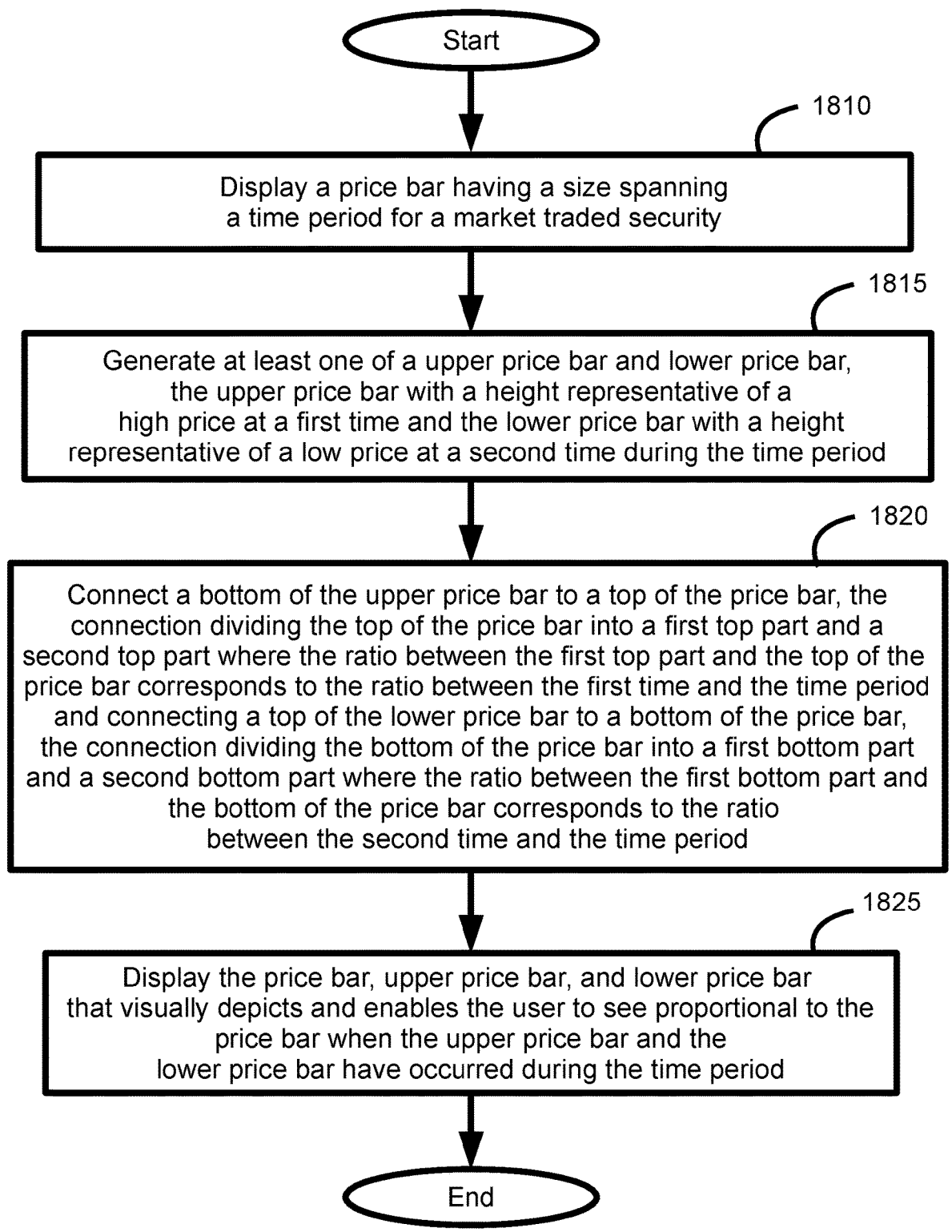
FIG. 18 is a flowchart illustrating the steps performed for generating and displaying an OHLC type of price bar in a preferred embodiment of the present invention.

FIG. 18 is a flowchart illustrating the steps performed for generating and displaying an OHLC type of price bar in a preferred embodiment of the present invention. When a network access device 210 receives security market data 225 including OHLC data 350, a device processor 315 in operative communication with a charting engine 340 can generate and display in step 1810 a price bar having a size spanning a time period for a market traded security and generate in step 1815 at least one of a upper bar and lower bar, the upper bar with a height representative of a high price at a first time and the lower bar with a height representative of a low price at a second time during the time period.

The upper bar and lower price bar can then be connected in step 1820 to the price bar by connecting a bottom of the upper bar to a top of the price bar, the connection dividing the top of the price bar into a first top part and a second top part where the ratio between the first top part and the top of the price bar corresponds to the ratio between the first time and the time period and connecting a top of the lower bar to a bottom of the price bar, the connection dividing the bottom of the price bar into a first bottom part and a second bottom part where the ratio between the first bottom part and the bottom of the price bar corresponds to the ratio between the second time and the time period. The price bar, upper bar, and lower bar can then be displayed in step 1825 that visually depicts and enables the user to see proportional to the price bar when the upper bar and the lower bar have occurred during the time period.

The price bar is representative of one of a close price, last price, open price, open-close price, and average price. The average price can be one of a simple moving average (SMA), exponential moving average (EMA), VWAP (Volume Weighted Average Price), TWAP (Time Weighted Average Price), mean price, median price, ATR (Average True Range) price and the like. The price bar is not vertical, for instance a price bar representing only a close price would be horizontal and a price bar representative of line drawn from an open price to a different close price would be diagonal. Such diagonal could be the equivalent of the same diagonal inside a body of the candle (if displayed) representing the same OHLC time period. The upper price bar and lower price bar are substantially vertical. The price bar, upper price bar, and lower price bar together visually depict to a user one of an enhanced HLC (high, low, close) bar and an enhanced OHLC (open, high, low, close) bar which can also be a current enhanced bar displayed adjacent to one or more previously displayed enhanced bars to form one of an enhanced HLC price chart and OHLC price chart. The enhanced HLC bar and enhanced OHLC bar can be rendered as one of a scalable vector graphic (SVG) and Canvas generated image. The price bar can also take the form of a body of a candle where the upper price bar is an upper wick and lower price bar is a lower wick that together visually depict to a user an enhanced candlestick which can be displayed adjacent to one or more previously displayed enhanced candlesticks to form an enhanced candlestick price chart. The enhanced candlestick can be rendered as one of a scalable vector graphic (SVG) and Canvas generated image with HTML and JavaScript using some commands such as rect( ), fillRect( ), strokeRect( ), clearRect( ), moveTo( ), lineTo( ), stroke( ), and fill( ), for example. The price bar can be a line drawn from the open price to the close price across the time period. The correspondence of the ratio between the first top part and the top of the price bar to the ratio between the first time and the time period is substantially equal. The charting engine can be in operative communication with at least one of a server device, client device, cloud device, and peer device.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A computer-implemented method for displaying to a user a price range during a time period, the method comprising:
    a charting engine displaying a price bar, the price bar having a width representative of the time period;
    generating an upper price bar and a lower price bar, the upper price bar having a height representative of a highest price, occurring at a first time, during the time period and the lower price bar having a height representative of a lowest price, occurring at a second time, during the time period;
    connecting a bottom of the upper price bar to a top of the price bar at a first connection point, the first connection point dividing the top of the price bar into a first top part and a second top part, wherein a ratio between the first top part and the top of the price bar corresponds to a ratio between the first time and the time period;
    connecting a top of the lower price bar to a bottom of the price bar at a second connection point, the second connection point dividing the bottom of the price bar into a first bottom part and a second bottom part, wherein a ratio between the first bottom part and the bottom of the price bar corresponds to a ratio between the second time and the time period; and
    the charting engine displaying the price bar, the upper price bar, and the lower price bar, which visually depict, and enable the user to see, relative to the price bar, respective times when the highest price and the lowest price occurred during the time period.

2. The method of claim 1, wherein the price bar is representative of one of a close price, a last price, an open price, an open-close price, and an average price.

3. The method of claim 1, wherein the price bar is not vertical, and the upper price bar and the lower price bar are vertical.

4. The method of claim 1, wherein the price bar is one of horizontal and diagonal.

5. The method of claim 1, wherein the price bar, the upper price bar, and the lower price bar together visually depict, to the user, one of an enhanced HLC (high, low, close) bar and an enhanced OHLC (open, high, low, close) bar.

6. The method of claim 5, wherein the one of the enhanced HLC bar and the enhanced OHLC bar is a current enhanced bar displayed adjacent to one or more previously displayed enhanced bars to form one of an enhanced HLC price chart and an OHLC price chart.

7. The method of claim 5, wherein the one of the enhanced HLC bar and the enhanced OHLC bar is rendered as one of a scalable vector graphic (SVG) and a Canvas generated image.

8. The method of claim 1, wherein the price bar is a body of a candle, the upper price bar is an upper wick, and the lower price bar is a lower wick that together visually depict, to the user, an enhanced candlestick.

9. The method of claim 8, wherein the enhanced candlestick is a current enhanced candlestick displayed adjacent to one or more previously displayed enhanced candlesticks to form an enhanced candlestick price chart.

10. The method of claim 8, wherein the enhanced candlestick is rendered as one of a scalable vector graphic (SVG) and a Canvas generated image.

11. The method of claim 1, wherein the price bar is a line drawn from an open price to a close price across the time period.

12. The method of claim 1, wherein the ratio between the first top part and the top of the price bar is substantially equal to the ratio between the first time and the time period.

13. The method of claim 1, wherein the charting engine is in operative communication with at least one of a server device, a client device, a cloud device, and a peer device.

14. A computer-implemented method for displaying, to a user, a HLC (high, low, close) bar representative of a price range during a time period including a plurality of intratime periods, the method comprising:
    a charting engine displaying a first vertical line having a height representative of a difference between a first high price and first low price, determined from HLC data of a first intratime period having a first close price;
    the charting engine displaying a second vertical line adjacent to the first vertical line, the second vertical line having a height representative of a difference between a second high price and a second low price, determined from HLC data of a second intratime period having a second close price;
    determining a highest intratime period having a highest price from among each high price of each of the plurality of intratime periods, and determining a lowest intratime period having a lowest price from among each low price of each of the plurality of intratime periods;
    generating the HLC bar including a horizontal close bar and an upper bar and a lower bar, by removing all portions of all vertical lines above and below the second close price from all intratime periods other than above the second close price of the determined highest intratime period and below the second close price of the determined lowest intratime period; and
    the charting engine displaying the generated HLC bar, wherein the generated HLC bar visually depicts, and enables the user to see, relative to the horizontal close bar, respective times when the highest price and the lowest price occurred during the time period.

15. The method of claim 14, further comprising dynamically generating and displaying a widening horizontal close bar by repetitively displaying a current vertical line from current HLC data of a current intratime period adjacent to all prior displayed generated vertical lines of all prior intratime periods, and repetitively generating a current horizontal close bar and at least one of a current upper bar and a current lower bar, wherein a width of the current horizontal close bar is equal to a sum of a width of the current intratime period and each width of all the prior intratime periods.

16. The method of claim 15, further comprising generating and displaying a final HLC bar having a final close bar and at least one of a final upper bar and a final lower bar, wherein a width of the final close bar is equal to a width of the time period.

17. The method of claim 14, further comprising generating the HLC data in real time after each intratime period of the plurality of intratime periods from a time/sales data streamed during the intratime period wherein the time/sales data includes a time and a sales price for each trade of one or more trades.

18. The method of claim 14, wherein the time period is from a fraction of a second to decades.

19. The method of claim 14, wherein the second vertical line is displayed to a right of the first vertical line.

20. The method of claim 14, further comprising generating the HLC data in real time from a streaming time/sales data wherein the streaming time/sales data includes a time and a sales price for each trade of one or more trades.

21. A computer-implemented method for displaying, to a user, an OHLC (open, high, low, close) bar representative of a price range during a time period including a plurality of intratime periods, the method comprising:
   a charting engine displaying a first vertical line having a height representative of a difference between a first high price and first low price, determined from OHLC (open, high, low, close) data of a first intratime period;
   the charting engine displaying a second vertical line adjacent to the first vertical line, the second vertical line having a height representative of a difference between a second high price and second low price, determined from OHLC data of a second intratime period having a close price;
   determining a highest intratime period having a highest price from each high price of each of the first and second intratime periods, and determining a lowest intratime period having a lowest price from each low price of each of the first and second intratime periods;
   generating an open-close line from an open price of the time period and the close price of the second intratime period; and
   the charting engine generating and displaying the OHLC bar by displaying the open-close line overlayed upon the first vertical line and the second vertical line, and generating at least one of an upper bar and a lower bar by removing all portions of all vertical lines above and below the open-close line from all of the plurality of intratime periods other than above the open-close line of the determined highest intratime period and below the open-close line of the determined lowest intratime period, wherein the OHLC bar visually depicts, and enables the user to see, relative to the open-close line, respective times when the upper bar and the lower bar occurred during the time period.

22. The method of claim 21, further comprising dynamically generating and displaying a widening open-close line by repetitively displaying a current vertical line from current OHLC data of a current intratime period adjacent to all prior displayed generated vertical lines of all prior intratime periods, and repetitively generating a current open-close line and at least one of a current upper bar and a current lower bar, wherein a width of the current open-close line corresponds to a sum of a width of the current intratime period and each width of all the prior intratime periods.

23. The method of claim 21, further comprising generating the OHLC data in real time after each intratime period from a time/sales data streamed during the intratime period wherein the time/sales data includes a time and a sales price for each trade of one or more trades.

24. The method of claim 21, further comprising generating the OHLC data in real time from a streaming time/sales data wherein the streaming time/sales data includes a time and a sales price for each trade of one or more trades.

25. A computer-implemented method for displaying, to a user, a display of a modified candlestick representative of a price range during a time period, wherein a candlestick includes a body and at least one of a upper wick and a lower wick, the body having a width and a height, wherein the width is representative of the time period and the height is representative of a difference between an open price and a close price during the time period, the upper wick having an upper center line projecting from a top of the body and having a height representative of a high price at a first time during the time period, and the lower wick having a lower center line projecting from a bottom of the body and having a height representative of a low price at a second time during the time period, the method comprising:
   determining whether the low price occurred before the high price during the time period;
   a charting engine generating the modified candlestick by one of (1) at least one of moving the upper wick to a right of the upper center line to a connection point substantially perpendicular to the top of the body and moving the lower wick to a left of the lower center line to a connection point substantially perpendicular to the bottom of the body when determining that the low price occurred before the high price, and (2) at least one of moving the upper wick to the left of the upper center line to a connection point substantially perpendicular to the top of the body and moving the lower wick to the right of the lower center line to a connection point substantially perpendicular to the bottom of the body when determining that the low price occurred after the high price; and
   the charting engine displaying the modified candlestick, which visually depicts, to the user, whether the low price occurred before or after the high price during the time period.

26. A computer-implemented method for displaying, to a user, a display of a modified candlestick representative of a price range during a time period, wherein a candlestick includes a body and at least one of a upper wick and lower wick, the body having a width and a height, wherein the width is representative of the time period and the height is representative of a difference between an open price and a close price during the time period, the upper wick having an upper center line projecting from a top of the body and having a height representative of a high price at a first time during the time period, and the lower wick having a lower center line projecting from a bottom of the body and having a height representative of a low price at a second time during the time period, the method comprising:
   determining whether the low price occurred before the high price during the time period;
   a charting engine generating the modified candlestick by one of (1) at least one of tilting a top of the upper wick clockwise from a pivot on the upper center line and tilting a bottom of the lower wick clockwise from a pivot on the lower center line, when determining that the low price occurred before the high price, and (2) at least one of a tilting a top of the upper wick counter-clockwise from the pivot on the upper center line and tilting a bottom of the lower wick counter-clockwise from a pivot on the lower center line, when determining that the low price occurred after the high price; and
   the charting engine displaying the modified candlestick, which visually depicts, to the user, whether the low price occurred before or after the high price during the time period.

27. A computer-implemented method for displaying, to a user, a display of a modified OHLC price bar representative of a price range during a time period, wherein an OHLC price bar includes a vertical price bar having a center point and a height representative of a difference between a high price and low price during the time period, the method comprising:
   determining whether the low price occurred before the high price during the time period;
   a charting engine generating the modified OHLC price bar by one of (1) tilting the vertical price bar clockwise from the center point of the vertical price bar, when determining that the low price occurred before the high price, and (2) tilting the vertical price bar counterclockwise from the center point of the vertical price bar, when determining that the low price occurred after the high price; and the charting engine displaying the modified OHLC price bar, which visually depicts, to the user, whether the low price occurred before or after the high price during the time period.

28. An apparatus comprising:
processing circuitry configured to
    display a price bar, the price bar having a width representative of a time period;
    generate an upper price bar and a lower price bar, the upper price bar having a height representative of a highest price, occurring at a first time, during the time period and the lower price bar having a height representative of a lowest price, occurring at a second time, during the time period;
    connect a bottom of the upper price bar to a top of the price bar at a first connection point, the first connection point dividing the top of the price bar into a first top part and a second top part, wherein a ratio between the first top part and the top of the price bar corresponds to a ratio between the first time and the time period;
    connect a top of the lower price bar to a bottom of the price bar at a second connection point, the second connection point dividing the bottom of the price bar into a first bottom part and a second bottom part, wherein a ratio between the first bottom part and the bottom of the price bar corresponds to a ratio between the second time and the time period; and
    display the price bar, the upper price bar, and the lower price bar, which visually depict, and enable a user to see, relative to the price bar, respective times when the highest price and the lowest price occurred during the time period.

29. An apparatus for displaying, to a user, a HLC (high, low, close) bar representative of a price range during a time period including a plurality of intratime periods, the apparatus comprising:
processing circuitry configured to
    display a first vertical line having a height representative of a difference between a first high price and first low price, determined from HLC data of a first intratime period having a first close price;
    display a second vertical line adjacent to the first vertical line, the second vertical line having a height representative of a difference between a second high price and a second low price, determined from HLC data of a second intratime period having a second close price;
    determine a highest intratime period having a highest price from among each high price of each of the plurality of intratime periods, and determining a lowest intratime period having a lowest price from among each low price of each of the plurality of intratime periods;
    generate the HLC bar including a horizontal close bar and an upper bar and a lower bar, by removing all portions of all vertical lines above and below the second close price from all intratime periods other than above the second close price of the determined highest intratime period and below the second close price of the determined lowest intratime period; and
    display the generated HLC bar, wherein the generated HLC bar visually depicts, and enables the user to see, relative to the horizontal close bar, respective times when the highest price and the lowest price occurred during the time period.

30. An apparatus for displaying, to a user, a OHLC (open, high, low, close) bar representative of a price range during a time period including a plurality of intratime periods, the apparatus comprising:
processing circuitry configured to
    display a first vertical line having a height representative of a difference between a first high price and first low price, determined from OHLC (open, high, low, close) data of a first intratime period;
    display a second vertical line adjacent to the first vertical line, the second vertical line having a height representative of a difference between a second high price and second low price, determined from OHLC data of a second intratime period having a close price;
    determine a highest intratime period having a highest price from each high price of each of the first and second intratime periods, and determining a lowest intratime period having a lowest price from each low price of each of the first and second intratime periods;
    generate an open-close line from an open price of the time period and the close price of the second intratime period; and
    generate and display the OHLC bar with the open-close line overlayed upon the first vertical line and the second vertical line, and generate at least one of an upper bar and a lower bar by removing all portions of all vertical lines above and below the open-close line from all of the plurality of intratime periods other than above the open-close line of the determined highest intratime period and below the open-close line of the determined lowest intratime period, wherein the OHLC bar visually depicts, and enables the user to see, relative to the open-close line, respective times when the upper bar and the lower bar occurred during the time period.

31. A non-transitory computer readable storage medium having instructions stored thereon that, upon execution by processing circuitry, cause the processing circuitry to perform a method for displaying to a user a price range during a time period, the method comprising:
    a charting engine displaying a price bar, the price bar having a width representative of the time period;
    generating an upper price bar and a lower price bar, the upper price bar having a height representative of a highest price, occurring at a first time, during the time period and the lower price bar having a height representative of a lowest price, occurring at a second time, during the time period;
    connecting a bottom of the upper price bar to a top of the price bar at a first connection point, the first connection point dividing the top of the price bar into a first top part and a second top part, wherein a ratio between the first top part and the top of the price bar corresponds to a ratio between the first time and the time period;
    connecting a top of the lower price bar to a bottom of the price bar at a second connection point, the second connection point dividing the bottom of the price bar into a first bottom part and a second bottom part, wherein a ratio between the first bottom part and the bottom of the price bar corresponds to a ratio between the second time and the time period; and the charting engine displaying the price bar, the upper price bar, and the lower price bar, which visually depict, and enable the user to see, relative to the price bar, respective times when the highest price and the lowest price occurred during the time period.

32. A non-transitory computer readable storage medium having instructions stored thereon that, upon execution by processing circuitry, cause the processing circuitry to perform a method for displaying, to a user, a HLC (high, low, close) bar representative of a price range during a time period including a plurality of intratime periods, the method comprising:
  a charting engine displaying a first vertical line having a height representative of a difference between a first high price and first low price, determined from HLC data of a first intratime period having a first close price;
  the charting engine displaying a second vertical line adjacent to the first vertical line, the second vertical line having a height representative of a difference between a second high price and a second low price, determined from HLC data of a second intratime period having a second close price;
  determining a highest intratime period having a highest price from among each high price of each of the plurality of intratime periods, and determining a lowest intratime period having a lowest price from among each low price of each of the plurality of intratime periods;
  generating the HLC bar including a horizontal close bar and an upper bar and a lower bar, by removing all portions of all vertical lines above and below the second close price from all intratime periods other than above the second close price of the determined highest intratime period and below the second close price of the determined lowest intratime period; and
  the charting engine displaying the generated HLC bar, wherein the generated HLC bar visually depicts, and enables the user to see, relative to the horizontal close bar, respective times when the highest price and the lowest price occurred during the time period.

33. The non-transitory computer readable storage medium of claim 32, the method further comprising dynamically generating and displaying a widening horizontal close bar by repetitively displaying a current vertical line from current HLC data of a current intratime period adjacent to all prior displayed generated vertical lines of all prior intratime periods, and repetitively generating a current horizontal close bar and at least one of a current upper bar and a current lower bar, wherein a width of the current horizontal close bar is equal to a sum of a width of the current intratime period and each width of all the prior intratime periods.

34. The non-transitory computer readable storage medium of claim 32, the method further comprising generating and displaying a final HLC bar having a final close bar and at least one of a final upper bar and a final lower bar, wherein a width of the final close bar is equal to a width of the time period.

35. The non-transitory computer readable storage medium of claim 32, the method further comprising generating the HLC data in real time after each intratime period of the plurality of intratime periods from a time/sales data streamed during the intratime period wherein the time/sales data includes a time and a sales price for each trade of one or more trades.

36. The non-transitory computer readable storage medium of claim 32, the method further comprising generating the HLC data in real time from a streaming time/sales data wherein the streaming time/sales data includes a time and a sales price for each trade of one or more trades.

37. A non-transitory computer readable storage medium having instructions stored thereon that, upon execution by processing circuitry, cause the processing circuitry to perform a method for displaying, to a user, an OHLC (open, high, low, close) bar representative of a price range during a time period including a plurality of intratime periods, the method comprising:
  a charting engine displaying a first vertical line having a height representative of a difference between a first high price and first low price, determined from OHLC (open, high, low, close) data of a first intratime period;
  the charting engine displaying a second vertical line adjacent to the first vertical line, the second vertical line having a height representative of a difference between a second high price and second low price, determined from OHLC data of a second intratime period having a close price;
  determining a highest intratime period having a highest price from each high price of each of the first and second intratime periods, and determining a lowest intratime period having a lowest price from each low price of each of the first and second intratime periods;
  generating an open-close line from an open price of the time period and the close price of the second intratime period; and
  the charting engine generating and displaying the OHLC bar by displaying the open-close line overlayed upon the first vertical line and the second vertical line, and generating at least one of an upper bar and a lower bar by removing all portions of all vertical lines above and below the open-close line from all of the plurality of intratime periods other than above the open-close line of the determined highest intratime period and below the open-close line of the determined lowest intratime period, wherein the OHLC bar visually depicts, and enables the user to see, relative to the open-close line, respective times when the upper bar and the lower bar occurred during the time period.

38. The non-transitory computer readable storage medium of claim 37, the method further comprising dynamically generating and displaying a widening open-close line by repetitively displaying a current vertical line from current OHLC data of a current intratime period adjacent to all prior displayed generated vertical lines of all prior intratime periods, and repetitively generating a current open-close line and at least one of a current upper bar and a current lower bar, wherein a width of the current open-close line corresponds to a sum of a width of the current intratime period and each width of all the prior intratime periods.

39. The non-transitory computer readable storage medium of claim 37, the method further comprising generating the OHLC data in real time after each intratime period from a time/sales data streamed during the intratime period wherein the time/sales data includes a time and a sales price for each trade of one or more trades.

40. The non-transitory computer readable storage medium of claim 37, the method further comprising generating the OHLC data in real time from a streaming time/sales data wherein the streaming time/sales data includes a time and a sales price for each trade of one or more trades.

* * * * *